(12) United States Patent
Hwang et al.

(10) Patent No.: US 11,515,967 B2
(45) Date of Patent: Nov. 29, 2022

(54) METHOD AND DEVICE FOR PERFORMING HARQ FEEDBACK OPERATION IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/568,443

(22) Filed: Jan. 4, 2022

(65) Prior Publication Data

US 2022/0131647 A1 Apr. 28, 2022

Related U.S. Application Data

(63) Continuation of application No. PCT/KR2020/008221, filed on Jun. 24, 2020.

(30) Foreign Application Priority Data

Jul. 10, 2019 (KR) ........................ 10-2019-0083476

(51) Int. Cl.
*H04L 1/16* (2006.01)
*H04L 1/18* (2006.01)
*H04L 5/00* (2006.01)
*H04W 72/12* (2009.01)

(52) U.S. Cl.
CPC .......... *H04L 1/1678* (2013.01); *H04L 1/1812* (2013.01); *H04L 5/0053* (2013.01); *H04W 72/1278* (2013.01)

(58) Field of Classification Search
CPC combination set(s) only.
See application file for complete search history.

(56) References Cited

U.S. PATENT DOCUMENTS

| 2019/0044667 | A1 | 2/2019 | Guo et al. | |
| 2020/0029318 | A1* | 1/2020 | Guo | H04L 1/1819 |
| 2020/0228290 | A1* | 7/2020 | Baghel | H04L 1/1825 |
| 2020/0351033 | A1* | 11/2020 | Ryu | H04W 72/02 |

(Continued)

FOREIGN PATENT DOCUMENTS

KR 20150082237 7/2015

OTHER PUBLICATIONS

Huawei & HiSilicon, "Sidelink physical layer procedures for NR V2X," Rl-1906008, Presented at 3GPP TSG RAN WG1 Meeting #97, Reno, USA, May 13-17, 2019, 23 pages.

(Continued)

*Primary Examiner* — Hanh N Nguyen

(74) *Attorney, Agent, or Firm* — Fish & Richardson P.C.

(57) ABSTRACT

According to an embodiment of the present disclosure, a method for performing sidelink communication by a first device is provided. The method comprises the steps of: transmitting at least one PSSCH to at least one reception device by using at least one sub channel and at least one slot in a resource pool; and receiving at least one HARQ feedback for the at least one PSSCH through at least one PSFCH resource from among M PSFCH resources in the resource pool, wherein the resource pool comprises K PSSCH-associated slots and L sub channels, which are associated with the PSFCH resources, M is greater than or equal to K*L, and K, L, and M may be positive integers.

15 Claims, 31 Drawing Sheets

(56) References Cited

U.S. PATENT DOCUMENTS

| | | | |
|---|---|---|---|
| 2020/0396040 A1* | 12/2020 | Miao | H04W 4/40 |
| 2022/0110097 A1* | 4/2022 | Zhao | H04L 1/1861 |
| 2022/0201654 A1* | 6/2022 | Lee | H04W 72/0406 |
| 2022/0210768 A1* | 6/2022 | Zhou | H04L 1/1896 |

OTHER PUBLICATIONS

Intel Corporation, "Physical layer procedures for NR V2X sidelink communication," R1-1906799, Presented at 3GPP TSG RAN WG1 Meeting #97, Reno, USA, May 13-17, 2019, 14 pages.

LG Electronics, "Discussion on physical layer procedures for NR sidelink," R1-1907018, Presented at 3GPP TSG RAN WG1 Meeting #97, Reno, USA, May 13-17, 2019, 11 pages.

Spreadtrum Communications, "Discussion on NR V2X physical layer procedure," R1-1902724, Presented at 3GPP TSG RAN WG1 #96, Athens, Greece, Feb. 25-Mar. 1, 2019, 7 pages.

Office Action in Indian Application No. 202217003394, dated May 20, 2022, 6 pages.

* cited by examiner

● : TX UE
⊘ : RX UE

METHOD AND DEVICE FOR PERFORMING HARQ FEEDBACK OPERATION IN NR V2X

CROSS-REFERENCE TO RELATED APPLICATIONS

Pursuant to 35 U.S.C. § 119(e), this application is a continuation of International Application PCT/KR2020/008221, with an international filing date of Jun. 24, 2020, which claims the benefit Korean Patent Application No. 10-2019-0083476, filed on Jul. 10, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for performing HARQ feedback operation in NR V2X, and device(s) (or UE(s)) performing the method.

Technical Solutions

Based on an embodiment of the present disclosure, a method for performing sidelink (SL) communication by a first device may be provided. The method may comprise:

transmitting, to at least one receiving device, at least one physical sidelink shared channel (PSSCH) by using at least one sub-channel and at least one slot on a resource pool; and receiving at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Based on an embodiment of the present disclosure, a non-transitory computer-readable storage medium storing instructions may be provided. The instructions, when executed, may cause a first device to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Based on an embodiment of the present disclosure, a method for performing sidelink (SL) communication by a second device may be provided. The method may comprise: receiving, from a first device, a physical sidelink shared channel (PSSCH); and transmitting, to the first device, a first hybrid automatic repeat request (HARQ) feedback for the PSSCH through a first physical sidelink feedback channel (PSFCH) resource, wherein at least one PSSCH including the PSSCH is transmitted by the first device to at least one receiving device including the second device by using at least one sub-channel and at least one slot on a resource pool, wherein at least one HARQ feedback for the at least one PSSCH is received by the first device through at least one PSFCH resource among M PSFCH resources on the resource pool, wherein the at least one HARQ feedback includes the first HARQ feedback, and the at least one PSFCH resource includes the first PSFCH resource, wherein the resource pool includes L sub-channels and K slots related to PSSCHs related to the PSFCH resources, wherein M is equal to or greater than K*L, and wherein K, L and M are positive integers.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a physical sidelink shared channel (PSSCH); and transmit, to the first device, a first hybrid automatic repeat request (HARQ) feedback for the PSSCH through a first physical sidelink feedback channel (PSFCH) resource, wherein at least one PSSCH including the PSSCH is transmitted by the first device to at least one receiving device including the second device by using at least one sub-channel and at least one slot on a resource pool, wherein at least one HARQ feedback for the at least one PSSCH is received by the first device through at least one PSFCH resource among M PSFCH resources on the resource pool, wherein the at least one HARQ feedback includes the first HARQ feedback, and the at least one PSFCH resource includes the first PSFCH resource, wherein the resource pool includes L sub-channels and K slots related to PSSCHs related to the PSFCH resources, wherein M is equal to or greater than K*L, and wherein K, L and M are positive integers.

Effects of the Disclosure

Based on the present disclosure, V2X communication between devices (or UEs) can be efficiently performed.

DESCRIPTION OF EXEMPLARY EMBODIMENTS

Figure 1:
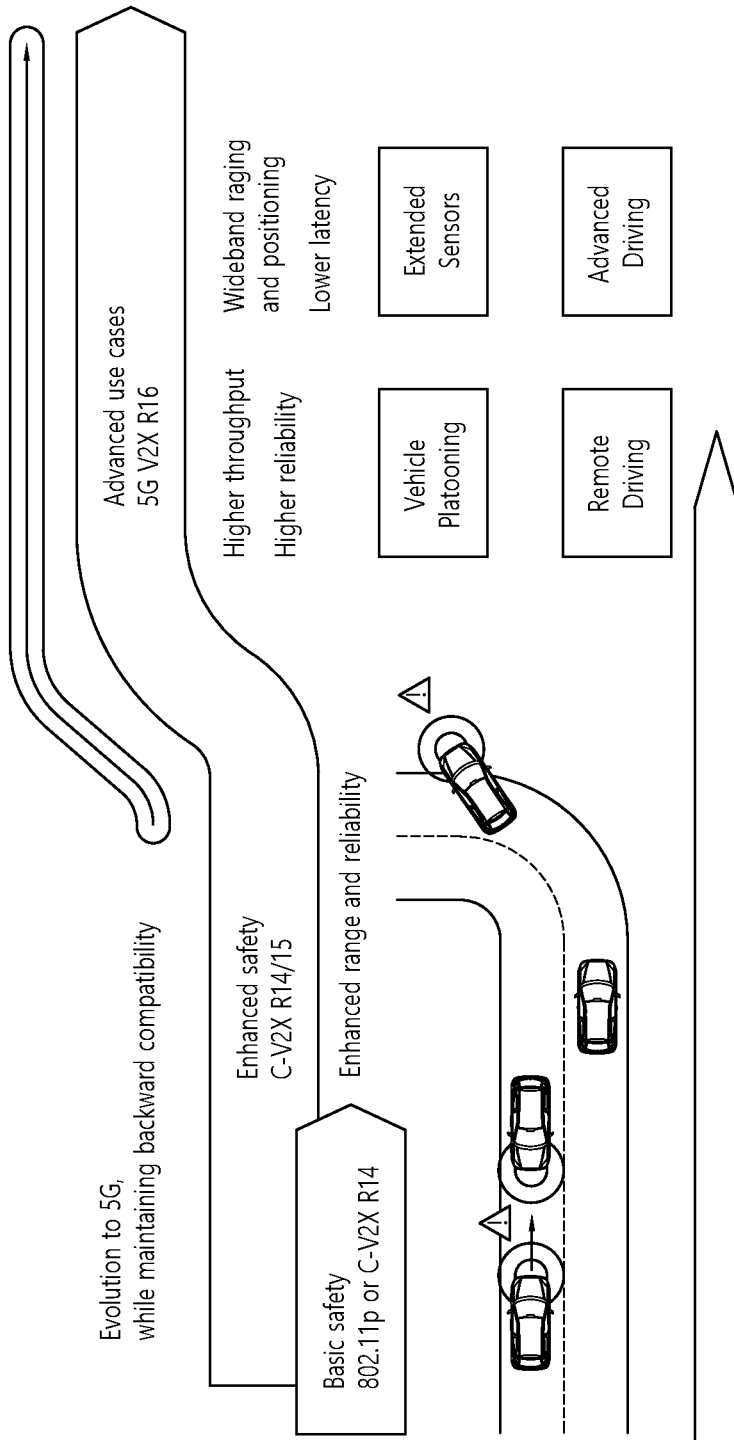
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
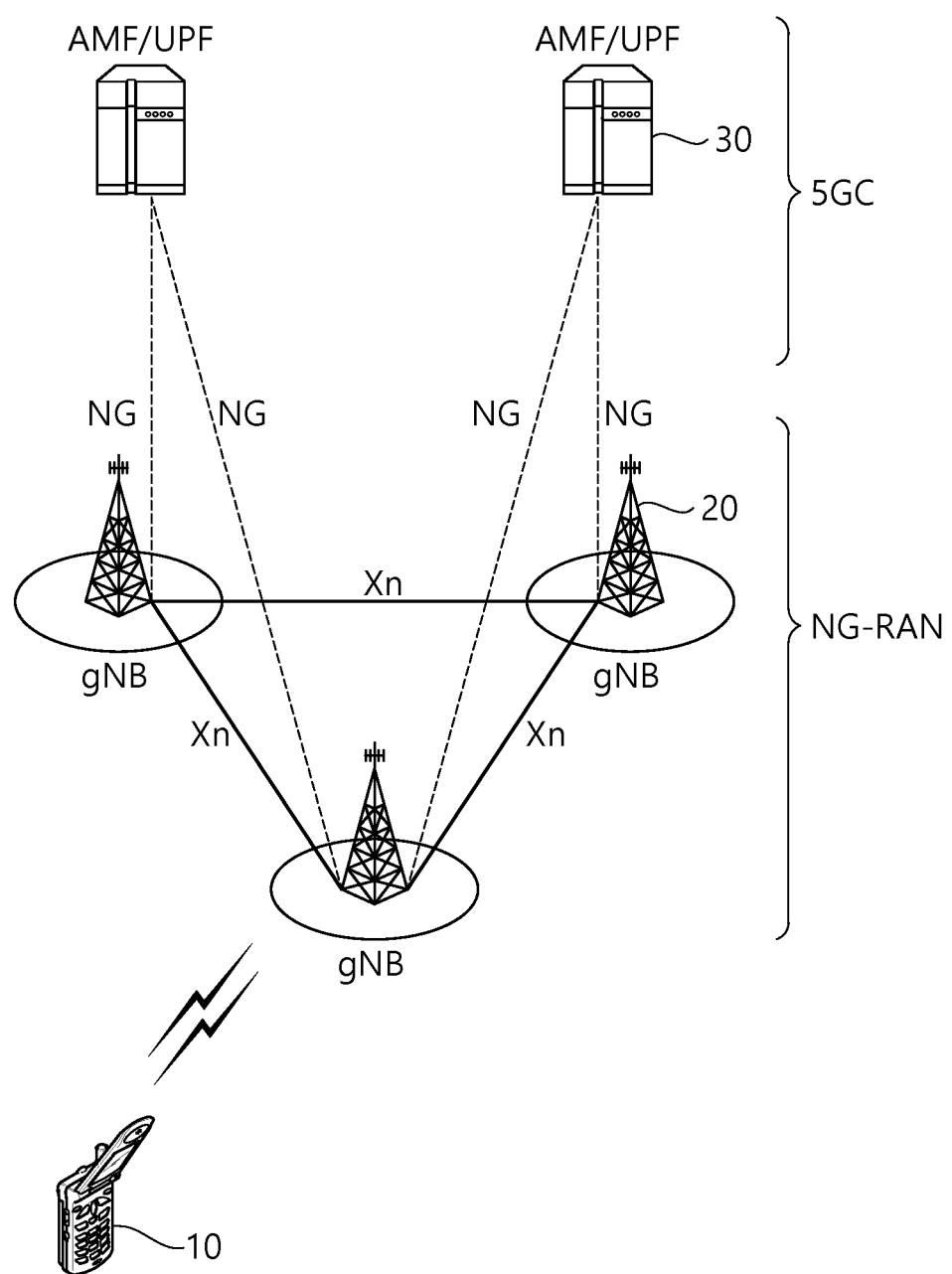
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
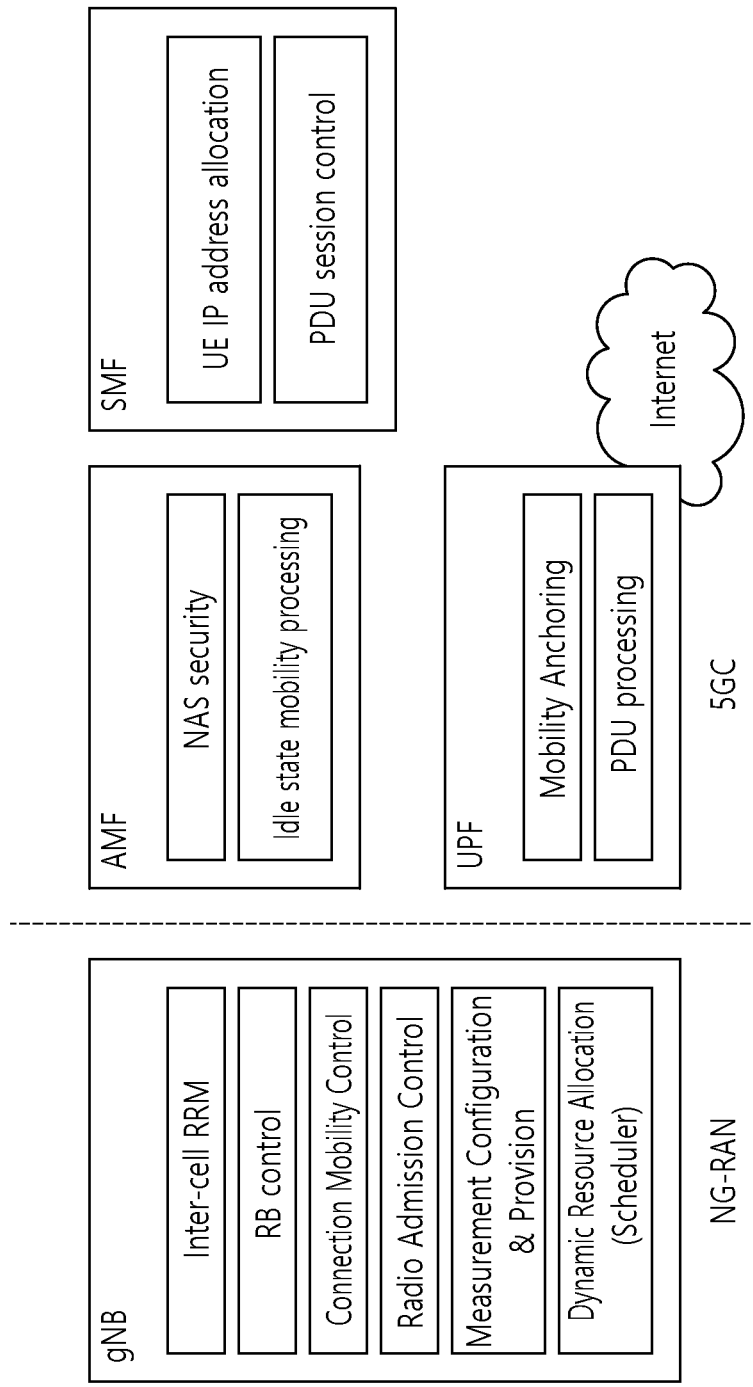
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
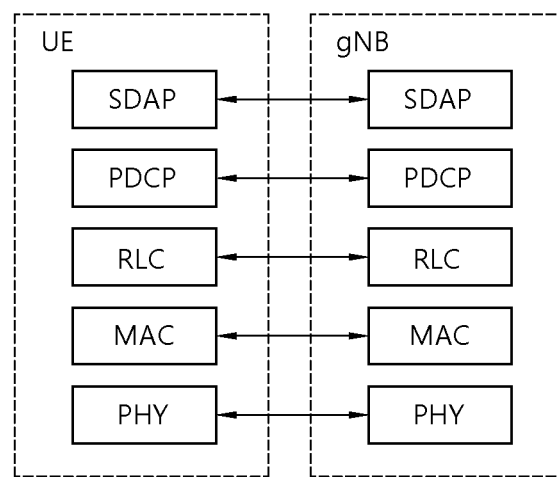
FIGS. 4A and 4B show a radio protocol architecture, based on an embodiment of the present disclosure.
Figure 4B:
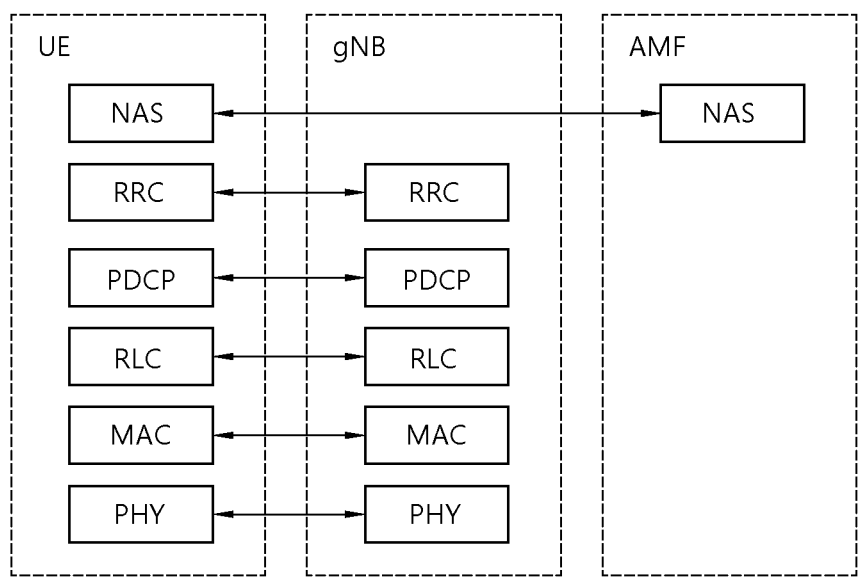

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
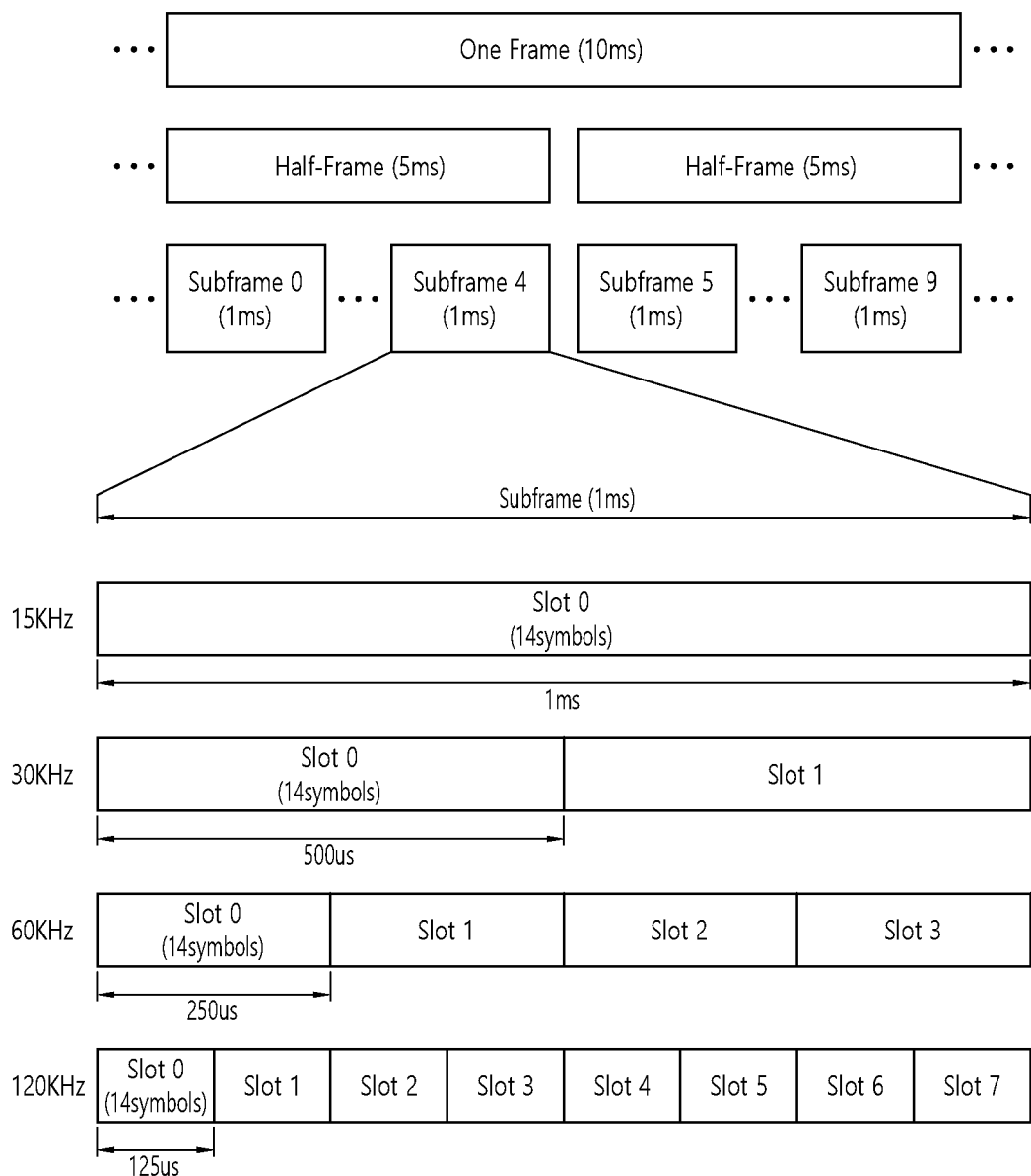
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 21

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
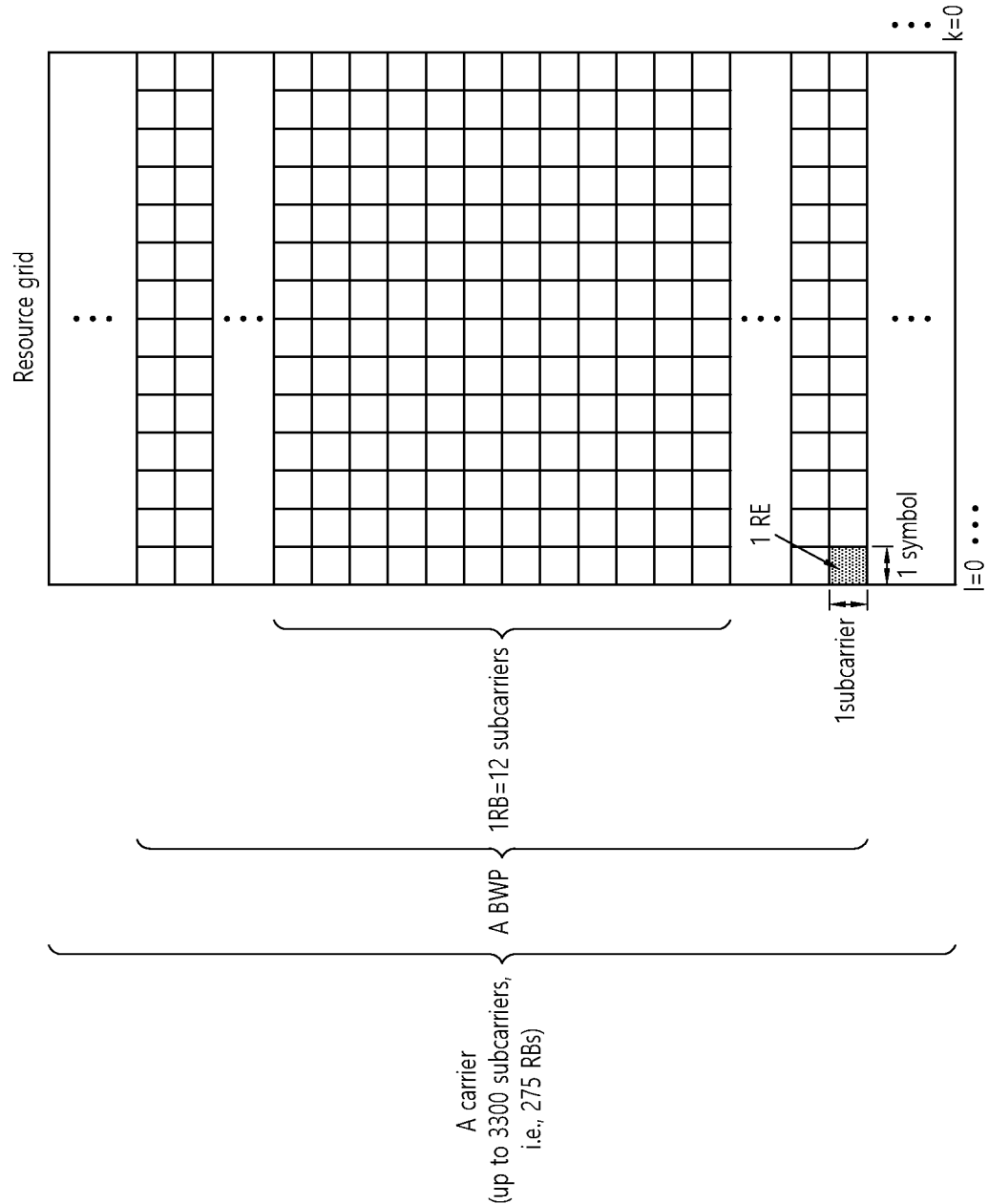
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
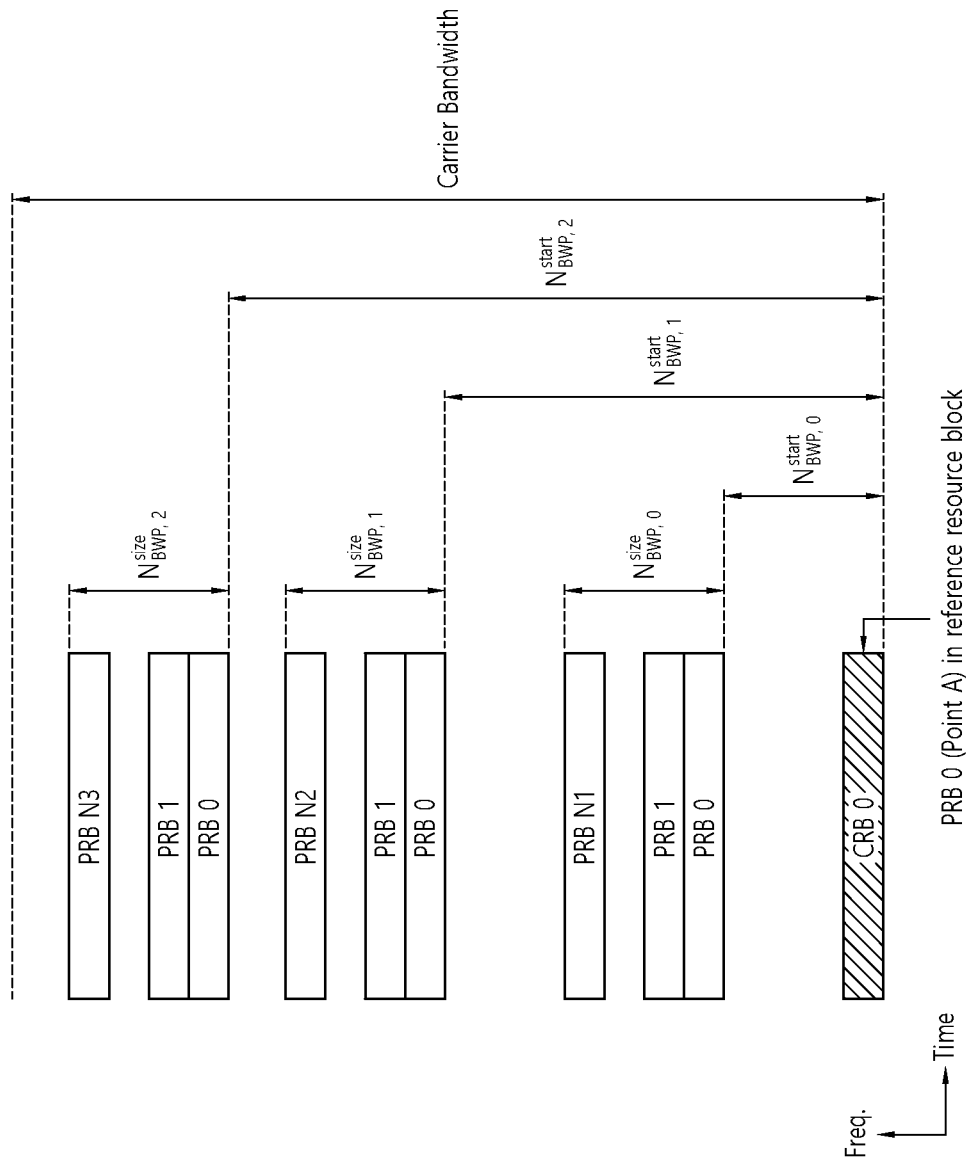
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
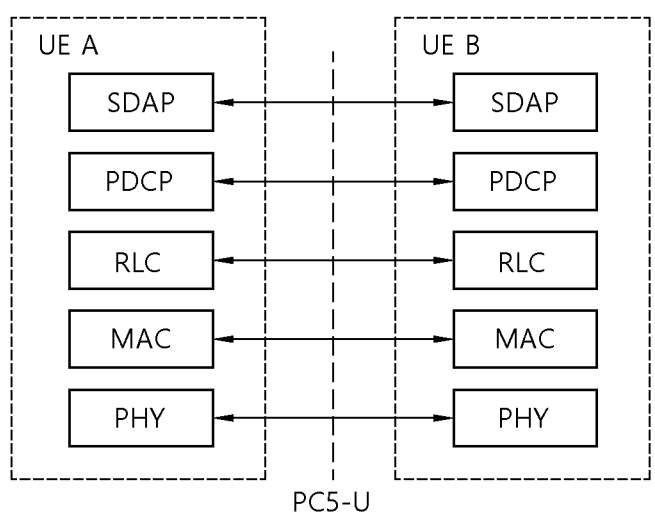
FIGS. 8A and 8B show a radio protocol architecture for a SL communication, based on an embodiment of the present disclosure.
Figure 8B:
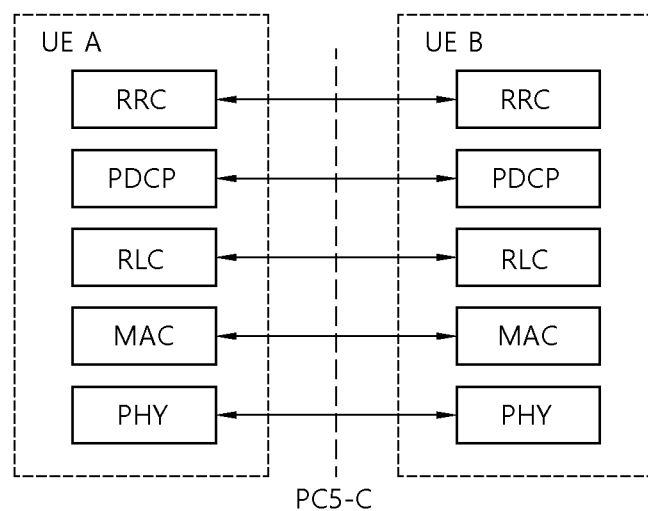

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
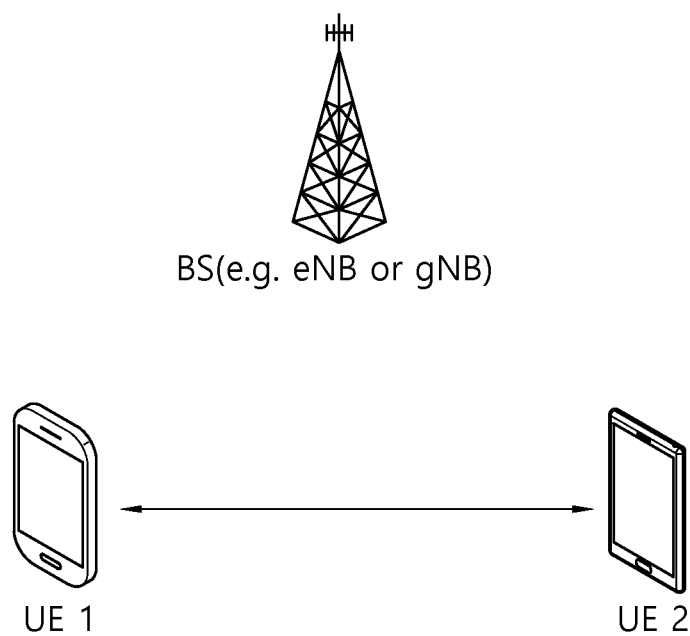
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
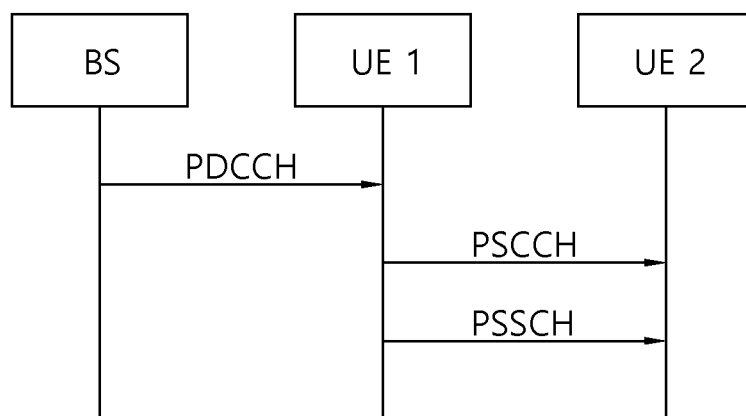
FIGS. 10A and 10B show a procedure of performing V2X or SL communication by a UE based on a transmission mode, based on an embodiment of the present disclosure.
Figure 10B:
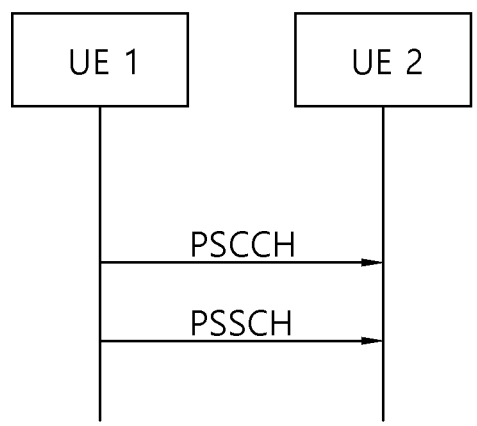

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
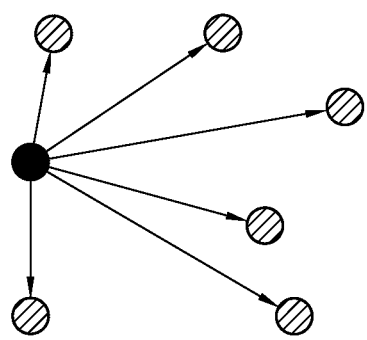
FIGS. 11A to 11C show three cast types, based on an embodiment of the present disclosure.
Figure 11B:
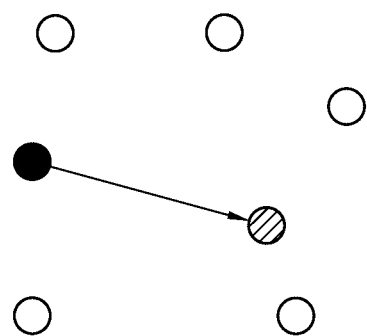
Figure 11C:
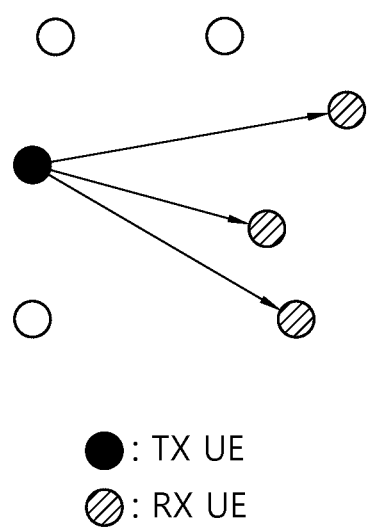

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, from the viewpoint of transmission of a UE in NR sidelink, time-division multiplexing (TDM) between a physical sidelink control channel (PSCCH), a physical sidelink shared channel (PSSCH) and a physical sidelink feedback channel (PSFCH) is allowed for a PSFCH format for sidelink in slots. In addition, in unicast sidelink communication, HARQ feedback transmission of UE(s) may be supported. In addition, in groupcast sidelink communication, HARQ feedback transmission of UE(s) may be supported.

If HARQ feedback is enabled for groupcast sidelink communication, the HARQ feedback option 1 or the HARQ feedback option 2 may be supported.

According to the HARQ feedback option 1, a receiving UE may transmit only HARQ NACK to a transmitting UE. That is, the receiving UE may not transmit HARQ ACK to the transmitting UE. If the HARQ feedback option 1 is used for sidelink groupcast transmission, a plurality of receiving UEs (e.g., all receiving UEs or some receiving UEs in a group) may share a PSFCH resource to transmit HARQ feedback.

On the other hand, according to the HARQ feedback option 2, a receiving UE may transmit HARQ ACK or HARQ NACK to a transmitting UE. If the HARQ feedback option 2 is used for sidelink groupcast transmission, a plurality of receiving UEs (e.g., each receiving UEs in a group) transmits HARQ ACK or HARQ NACK by using separate PSFCH resources. For example, each of PSFCH resources may be mapped to a time resource, a frequency resource, and a code resource.

In slots associated with a resource pool, PSFCH resources may be periodically (pre-)configured with a period of N slots. For example, N may be a positive integer. For example, N may be 2 or 4.

Meanwhile, in NR sidelink, a sequence-based PSFCH format having one symbol may be supported. The one symbol does not include an automatic gain control (AGC) training period. The sequence-based PSFCH format having the one symbol may be applicable to HARQ feedback in unicast. In addition, the sequence-based PSFCH format having one symbol may be applicable to HARQ feedback in groupcast including the HARQ feedback option 1 and the HARQ feedback option 2. The sequence of PUCCH format 0 may be similar to the sequence-based PSFCH format having the one symbol.

In the case of the HARQ feedback option 1 based on TX-RX distance-based HARQ feedback for groupcast, if the TX-RX distance is less than or equal to the communication range requirement, a receiving UE may transmit HARQ feedback for a PSSCH. Otherwise, the receiving UE may not transmit HARQ feedback for the PSSCH. For example, the location of the transmitting UE may be indicated by a SCI related to the PSSCH.

Meanwhile, for PSSCH transmission in the last symbol of slot n, HARQ feedback related to the PSSCH transmission is expected to be in slot n+a. Herein, a may be the smallest integer greater than or equal to K under the condition that slot n+a includes PSFCH resource(s). In addition, if at least a PSFCH in the slot is a response to a single PSSCH, the implicit mechanism may be used to determine at least a frequency domain resource and/or a code domain resource of the PSFCH within the configured resource pool.

Meanwhile, all or a part of resources through which a plurality of PSSCHs are transmitted may overlap. For example, resources through which a plurality of PSSCHs are transmitted may completely or partially overlap each other on a frequency domain. For example, resources through which a plurality of PSSCHs are transmitted may completely or partially overlap each other on a time domain. For example, resources through which a plurality of PSSCHs are transmitted may completely or partially overlap each other on a code domain. If all or a part of resources for transmitting a plurality of PSSCHs overlap, PSFCH resources for each PSSCH may need to be distinguished.

Meanwhile, PSSCHs transmitted through different resources may correspond to different transmitting UEs and/or receiving UEs, and PSFCH transmissions corresponding thereto may also occur from different UEs. For example, different transmitting UEs may transmit PSSCHs through different resources, and different transmitting UEs may receive PSFCHs corresponding to the PSSCHs from different UEs. In the above case, in general, transmit power of the PSFCHs may be different. Therefore, if a plurality of PSFCH resources are multiplexed in a code domain (i.e., code-division multiplexing (CDM)), a problem (hereinafter, a near-far problem) in which the UE cannot detect a specific PSFCH signal may occur due to a large difference in receive power at the PSFCH receiving end. For example, the case in which a plurality of PSFCH resources are multiplexed in the code domain may mean a case in which a plurality of PSFCH resources overlapping in time and frequency resources are transmitted by using different codes.

Figure 12:
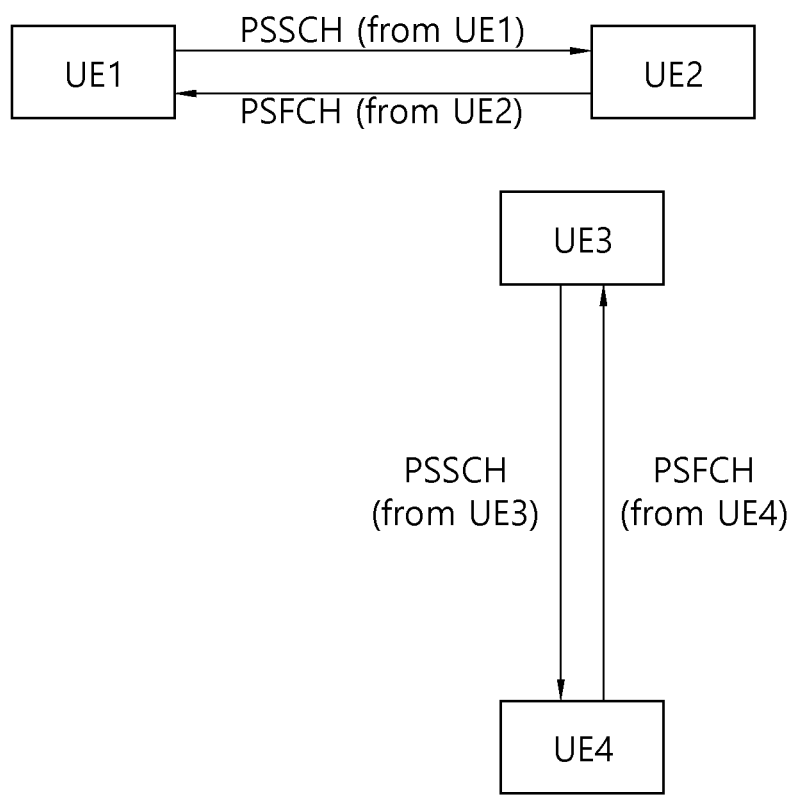
FIG. 12 shows an example of a plurality of UEs transmitting and receiving PSSCHs and PSFCHs.
Figure 13:
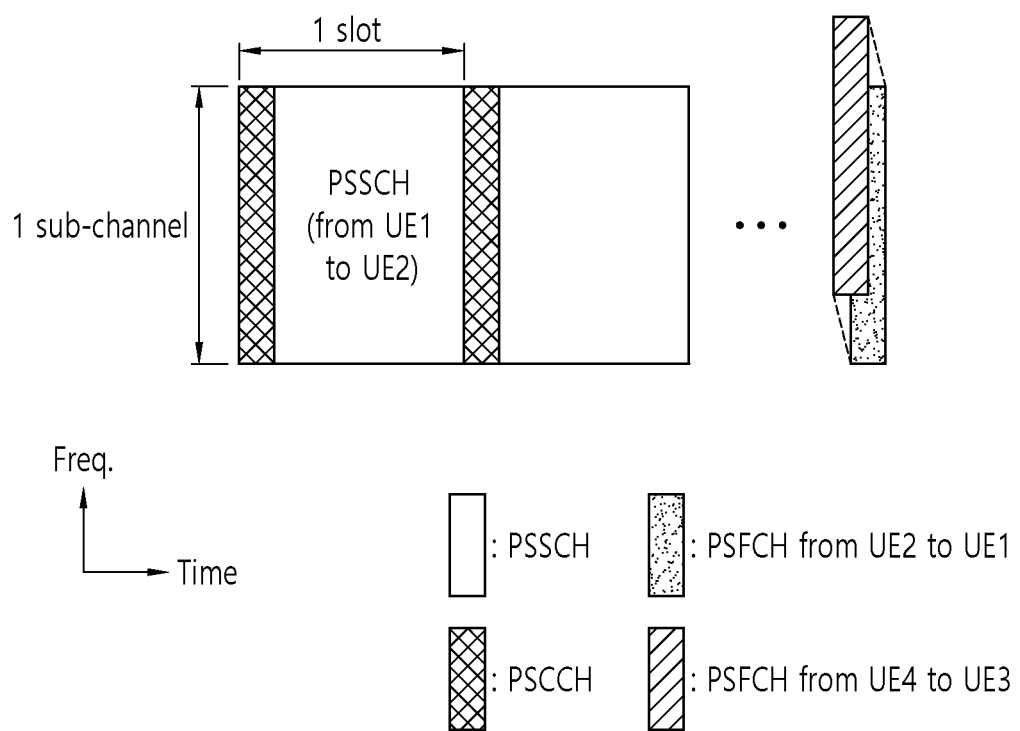
FIG. 13 shows an example of PSFCH resource allocation.

FIG. 12 shows an example of a plurality of UEs transmitting and receiving PSSCHs and PSFCHs, and FIG. 13 shows an example of PSFCH resource allocation.

Referring to FIG. 12, for example, if a PSFCH transmitted by a UE2 to a UE1 and a PSFCH transmitted by a UE4 to a UE3 are CDM, that is, if the PSFCH from the UE2 and the PSFCH from the UE4 are transmitted on overlapping time and frequency resources by using different codes, the UE3 cannot detect the PSFCH transmitted by the UE4 if receive power of the PSFCH transmitted by the UE2 is greater than receive power of the PSFCH transmitted by the UE4 by a certain level in terms of the UE3. Referring to FIG. 13, specifically, a PSFCH corresponding to a PSSCH transmitted from a UE1 to a UE2 and a PSFCH corresponding to a PSSCH transmitted from a UE3 to a UE4 may be CDM.

Furthermore, if a plurality of PSFCH resources are adjacent on a frequency domain, an interference problem (hereinafter, an inter-band emission (IBE) problem) may occur. IBE may mean that transmit power of signal(s) transmitted by a UE is emitted in a band other than an intended frequency band, thereby reducing reception quality by interfering with other signals being transmitted in a frequency band not used by the UE. For example, if a PSFCH resource #1 and a PSFCH resource #2 are adjacent on a frequency domain, HARQ feedback received through the PSFCH resource #1 and HARQ feedback received through the PSFCH resource #2 by the UE may interfere with each other. Therefore, due to the above IBE problem, the UE may fail to receive HARQ feedback.

Meanwhile, PSFCH resources for PSSCHs transmitted in a plurality of slots may occur in the same slot. In this case, considering latency requirements and performance of the corresponding service, it may be inefficient for a UE to transmit a PSFCH corresponding to a PSSCH transmitted in a slot far in time from a slot in which PSFCH resources exists. For example, if a first UE transmits data for service(s) requiring low latency to a second UE through a specific PSSCH resource, it may be unnecessary for the second UE to transmit a PSFCH to the first UE in a slot far in time from a slot in which the specific PSSCH resource exists. In this case, in order to satisfy latency requirements, the UE receiving the PSSCH may omit transmission of the PSFCH. That is, it may be efficient for the UE to preferentially secure a PSFCH resource corresponding to a resource for a PSSCH transmitted in a slot close in time to a slot in which PSFCH resources exists.

In one embodiment, M PSFCH resources for a PSSCH transmitted by a transmitting UE to at least one receiving UE may be allocated in a first slot. In this case, a PSFCH resource related to a slot closest in time to the first slot among K slots related to the PSSCH may be one of the at least one PSFCH resource. In addition, a PSFCH resource related to a slot farthest in time from the first slot among K slots related to the PSSCH may not be included in the at least one PSFCH resource.

Meanwhile, in the case of groupcast in the next-generation system, a plurality of receiving UE which has received a PSCCH may transmit HARQ feedback for the same PSSCH, respectively. In this case, there may be a plurality of PSFCH resources corresponding to a specific PSSCH, and each of PSFCH resources may be distinguished.

Hereinafter, based on an embodiment of the present disclosure, a method for efficiently performing, by a UE, a HARQ process operation in case PSFCH resources are insufficient, and an apparatus supporting the same are proposed.

Figure 14:
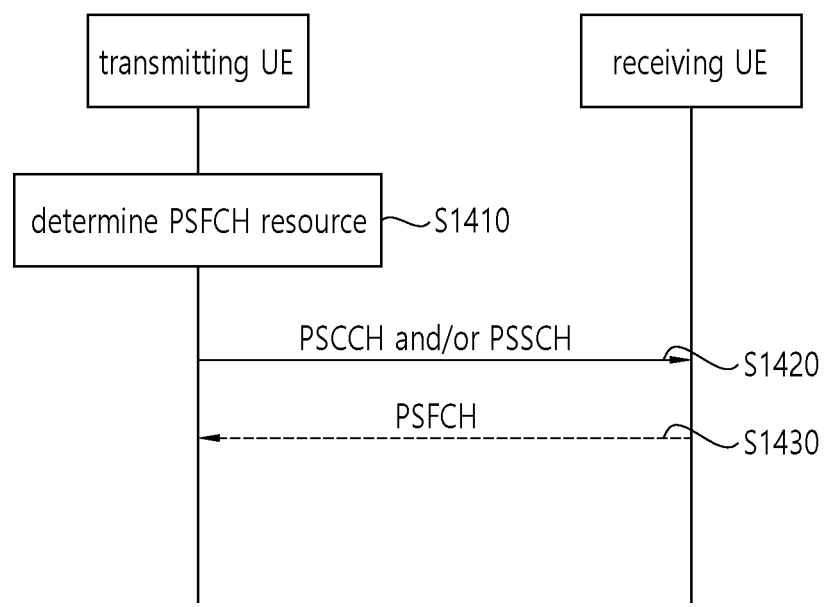
FIG. 14 shows a procedure in which a transmitting UE and a receiving UE transmit/receive a PSSCH, a PSCCH, and/or a PSFCH, based on an embodiment of the present disclosure.

FIG. 14 shows a procedure in which a transmitting UE and a receiving UE transmit/receive a PSSCH, a PSCCH, and/or a PSFCH, based on an embodiment of the present disclosure.

Referring to FIG. 14, in step S1410, the transmitting UE may determine/select/allocate PSFCH resource(s). For example, based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method, information related to the PSSCH transmitting UE, information related to PSSCH transmission, or information related to the PSSCH receiving UE, the transmitting UE may select the PSFCH resource(s) to be used for HARQ feedback. For example, the information related to the PSSCH transmitting UE may be information regarding a UE which transmits a PSSCH (e.g., a source ID of the transmitting UE). For example, the information related to the PSSCH receiving UE may be information regarding a UE receiving the PSSCH (e.g., an identifier provided by a higher layer or a source ID of the receiving UE). For example, the information related to PSSCH transmission may include at least one of DMRS sequence(s) used for PSSCH transmission or parameter(s) for generating the DMRS sequence(s), or DMRS sequence(s) used for PSCCH transmission corresponding to the PSSCH or parameter(s) for generating the DMRS sequence(s).

For example, the PSFCH resource(s) may correspond to a combination of resource block(s) (RB(s)) and/or code domain resource(s). For example, a sub-channel may include one or more RBs. For example, the cast type may be unicast or groupcast. For example, the HARQ feedback method may be divided into two types. Based on the first HARQ feedback method, the transmitting UE may transmit a PSSCH to a plurality of receiving UEs in groupcast, and the receiving UE may transmit HARQ feedback related to the PSSCH to the transmitting UE through a common PSFCH resource. In this case, the receiving UE may transmit NACK to the transmitting UE through the common PSFCH resource only if the receiving UE fails to decode the PSSCH. On the other hand, if the receiving UE succeeds in decoding the PSSCH, the receiving UE may not transmit ACK to the transmitting UE. Based on the second HARQ feedback method, the transmitting UE may transmit a PSSCH to a plurality of receiving UEs in groupcast, and the receiving UE may transmit HARQ feedback related to the PSSCH to the transmitting UE through different PSFCH resources.

Additionally, based on an embodiment of the present disclosure, the mapping relationship between the PSFCH resource(s) and the input parameter(s) occurs in a logical domain (or logical resource), and it may be remapped later in a physical domain (or physical resource). For example, based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method, information related to the PSSCH transmitting UE, information related to PSSCH transmission, or information related to the PSSCH receiving UE, the transmitting UE may select/determine PSFCH resource(s) to be used for HARQ feedback in a logical domain. In addition, the transmitting UE may map the PSFCH resource(s) selected/determined in the logical domain to a physical domain (i.e., physical resource(s)). In the process of mapping the PSFCH resource(s) to the physical resource(s), the size of the physical resource(s) may be less than the size of the logical resource(s). Accordingly, if the size of the physical resource(s) is less than the size of the logical resource(s), PSFCH resources corresponding to different PSSCHs may partially overlap.

For example, the size of the physical domain (or physical resource(s)) of the PSFCH resource for the PSSCH may indicate/represent the size of the resource domain for the PSFCH based on at least one of a time resource, a frequency resource, or a code resource. For example, the size of the physical domain of the PSFCH resource for the PSSCH may indicate/represent the size of the resource domain for the PSFCH based on the time resource, the frequency resource, and the code resource. In this case, for example, the logical domain of the PSFCH resource for the PSSCH may indicate/represent a PSFCH resource domain determined based on other factors without considering the physical domain. However, this example is only an example of defining the size of the physical domain of the PSFCH resource and the logical domain of the PSFCH resource, and the definition of the physical domain and the logical domain described throughout the present disclosure is not limited by this example.

Based on an embodiment of the present disclosure, the transmitting UE may map a logical resource(s) to physical resource(s) in units of all logical resources. For example, assuming that the total number of logical resources is K and the total number of physical resources is L, the transmitting UE may map K logical resources to L physical resources.

Based on an embodiment of the present disclosure, the transmitting UE may map logical resource(s) to physical resource(s) in units of some logical resources among all logical resources. For example, assuming that the total number of logical resources is K and the total number of physical resources is L, the transmitting UE may map K/2 logical resources to L/2 physical resources, and may map the remaining K/2 logical resources to L/2 physical resources. If the transmitting UE maps logical resource(s) to physical resource(s) in units of some logical resources among all logical resources, the transmitting UE may distribute logical resource(s) which is not mapped to physical resource(s) or logical resource(s) which is overlapped and mapped to physical resource(s).

If the size of the logical resource(s) (or logical domain) becomes greater than the physical resource(s) (or physical domain) in the process of the transmitting UE securing interval(s) between a plurality of PSFCH resources (e.g., N RB interval(s)) in the logical domain, the transmitting UE may remap the PSFCH resource(s) on the logical resource(s) to the physical resource(s) so that collision between the PSFCH resources is minimized. For example, if a virtual PSFCH resource index in the logical domain exceeds the size of the physical domain, the transmitting UE may divide the virtual PSFCH resource index by a parameter of the size of the physical domain based on a modulo function. In this case, the virtual PSFCH resource index is an intermediate index used in the process of indexing each PSFCH resource. Furthermore, the transmitting UE may obtain a PSFCH resource index by considering an offset value in addition to the value obtained by using the modulo function. Accordingly, it is possible to prevent repeated collision of PSFCH resources. That is, the offset value may be a value obtained or configured by using a virtual PSFCH resource index, the size of the physical domain, and/or an interval between PSFCH resources as parameters. For example, if the virtual PSFCH resource index in the logical domain exceeds the size of the physical domain, the PSFCH resource index may be defined as in Equation 1, Equation 2, or Equation 3.

PSFCH resource index=mod(virtual PSFCH resource index,size of physical domain)+offset [Equation 1]

PSFCH resource index=mod(virtual PSFCH resource index,size of physical domain) [Equation 2]

PSFCH resource index=mod((virtual PSFCH resource index), (total number of PSFCH resources on time resource, frequency resource and code resource)) [Equation 3]

For example, the virtual PSFCH resource index of the logical domain of the PSFCH resource may be determined based on at least one of PSSCH-related slots, sub-channels, or an interval between PSFCH resource(s).

For example, the size of the physical domain of the PSFCH resource may be determined based on the total number of PSFCH resources on the time resource, the frequency resource, and the code resource.

Meanwhile, in the case of a specific parameter, the transmitting UE may select the PSFCH resource(s) so that the maximum RB interval is secured between a plurality of PSFCH resources.

Figure 15:
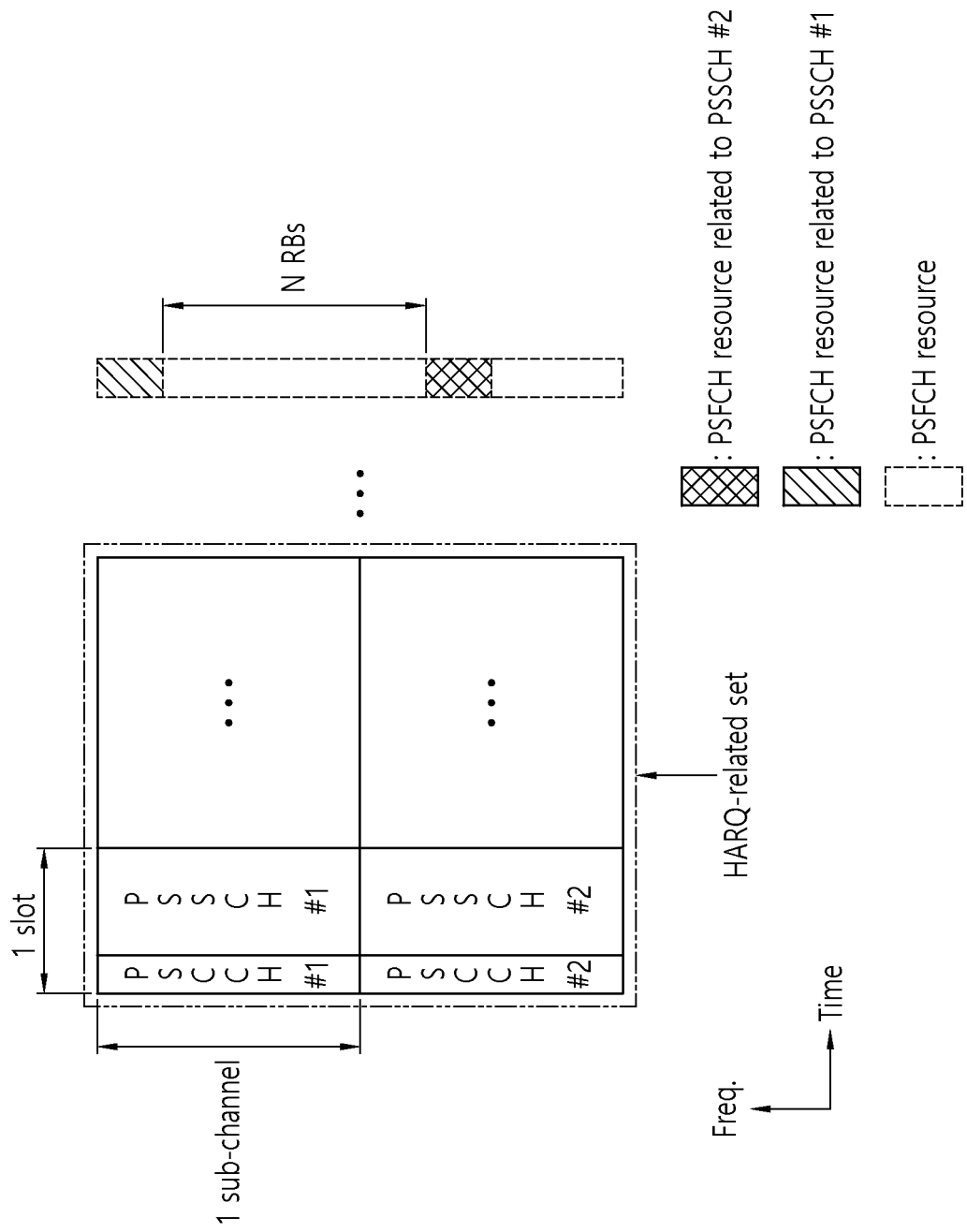
FIG. 15 shows an example of PSFCH resource allocation.
Figure 16:
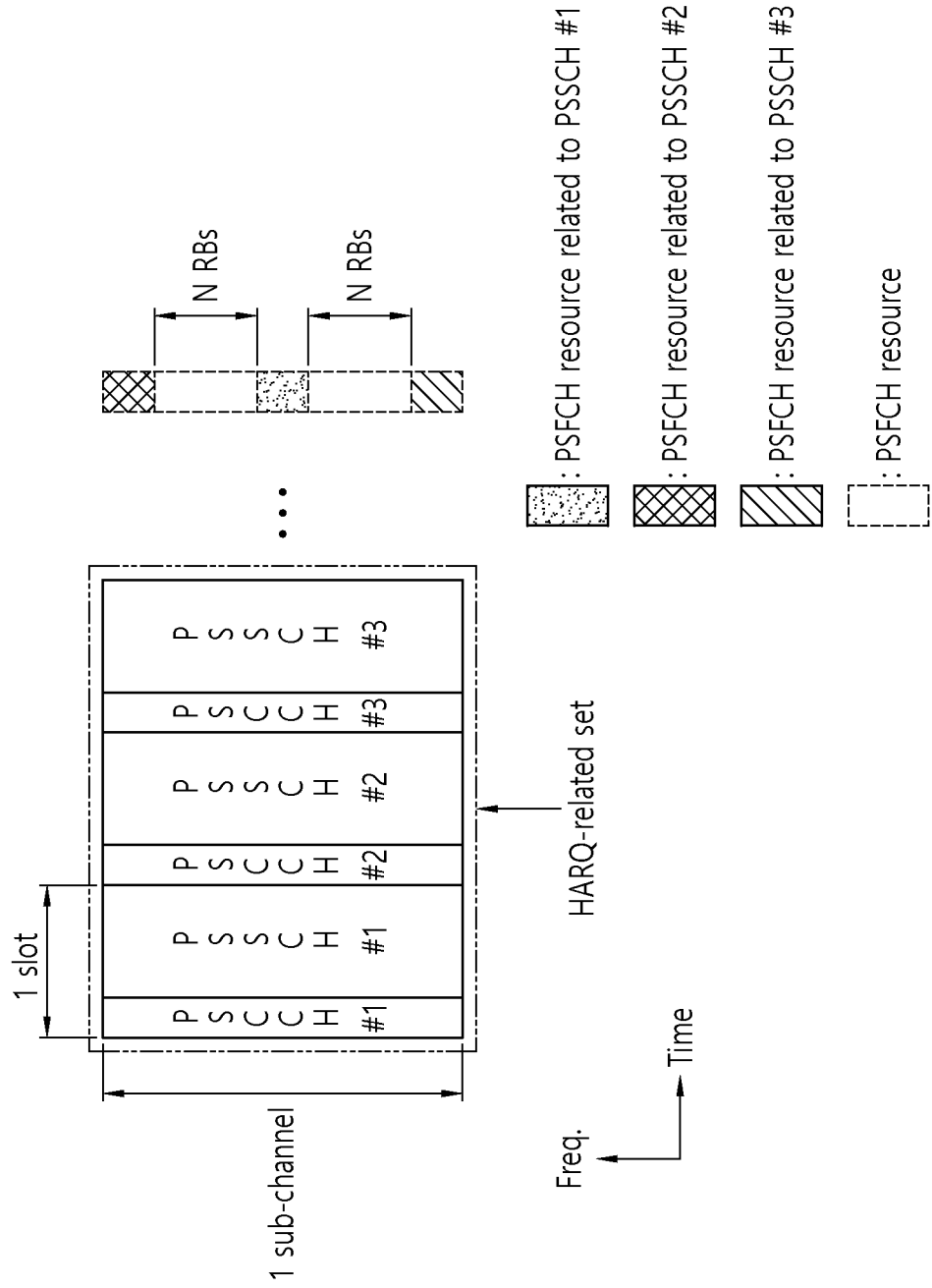
FIG. 16 shows another example of PSFCH resource allocation.

FIG. 15 shows an example of PSFCH resource allocation, and FIG. 16 shows another example of PSFCH resource allocation.

For example, as in the embodiment of FIG. 15, the transmitting UE may select/determine a plurality of PSFCH resources so that N RB intervals exist between a plurality of PSFCH resources related to a plurality of PSSCHs transmitted on different sub-channels. For example, N may be a positive integer. Additionally/alternatively, as in the embodiment of FIG. 16, the transmitting UE may select/determine a plurality of PSFCH resources so that N RB intervals exist between a plurality of PSFCH resources related to a plurality of PSSCHs transmitted on different slots. In the present disclosure, the HARQ-related set may be a set of slots for PSCCH(s) and/or PSSCH(s) related to PSFCH(s) transmitted in the same slot.

For example, the transmitting UE may expect that interval(s) between PSFCH resources for different sub-channels and/or interval(s) between PSFCH resources for different slots is distinguished by an RB level.

On the other hand, in the case of interval(s) between PSFCH resources according to the transmitting UE which has transmitted the PSSCH and/or the receiving UE, it may be allowed on RBs adjacent to each other and/or it may be allowed to be CDM within the same RB. For example, if the receiving UE can perform power control when transmitting the PSFCH, and similar reception power can be guaranteed at the PSSCH transmitting UE through the power control, the near-far problem can be avoided or alleviated even if CDM between the corresponding PSFCH resources is supported. In addition, even if PSFCH resources are allocated in adjacent RBs, the IBE problem can be alleviated. Accordingly, in the above case, the transmitting UE may allocate resources for a plurality of PSFCHs to adjacent RBs. Alternatively, the transmitting UE may allocate resources for a plurality of PSFCHs to the same RB.

Based on an embodiment of the present disclosure, if physical PSFCH resources are insufficient in the process of mapping logical resource(s) to physical resource(s), the transmitting UE may determine/assume that there is no PSFCH resource determined according to a combination of parameters. For example, in this case, the transmitting/ receiving UE may be expected to operate without HARQ feedback for the corresponding PSSCH transmission. For example, the parameter may include at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method, information related to the PSSCH transmitting UE, information related to PSSCH transmission, or information related to the PSSCH receiving UE.

Figure 17:
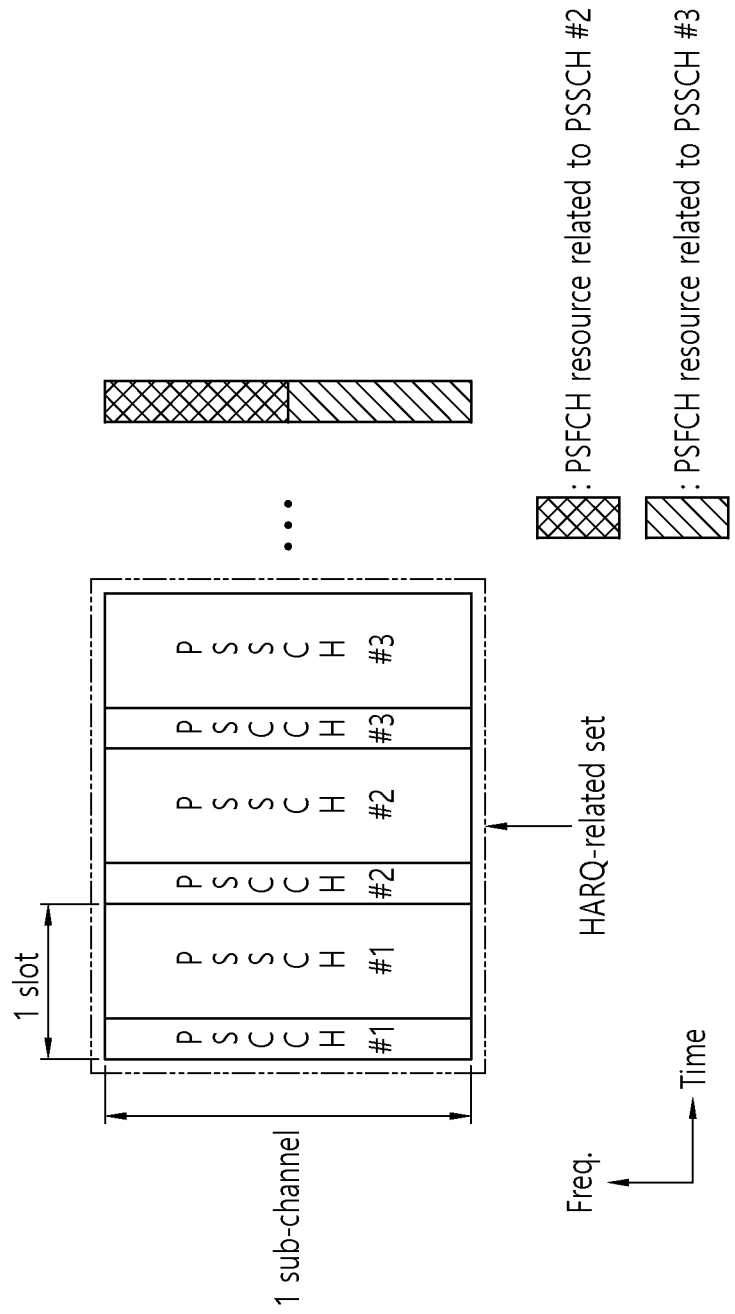
FIG. 17 shows another example of PSFCH resource allocation.

FIG. 17 shows another example of PSFCH resource allocation.

For example, referring to another embodiment in FIG. 17, the transmitting UE may transmit a PSSCH #1 to a PSSCH #3 to the receiving UE. In the embodiment of FIG. 17, it is assumed that the size of the logical domain related to PSFCHs is 3, while the size of the physical domain is 2. As in the above embodiment, if physical PSFCH resources are insufficient in the process of mapping logical resource(s) to physical resource(s) (i.e., if there are insufficient or no physical PSFCH resources to allocate PSFCH resources related to the PSCCH #1), the transmitting UE may not receive HARQ feedback through a PSFCH corresponding to the PSSCH #1.

Based on an embodiment of the present disclosure, if the transmitting UE is able to indicate/represent a plurality of PSSCH resources through a sidelink control information (SCI), an operation of the transmitting UE and/or the receiving UE may be different for the case in which a PSFCH resource is present and the case in which there is no PSFCH resource. More specifically, if there is a PSFCH resource corresponding to the PSSCH, the transmitting UE may perform retransmission through PSSCH resource(s) allocated for retransmission when the transmitting UE which has transmitted the PSSCH receives HARQ NACK. On the other hand, if there is no PSFCH resource corresponding to the PSSCH, the transmitting UE which has transmitted the PSSCH may perform retransmission through PSSCH resource(s) allocated for retransmission in a manner such as blind retransmission, without HARQ feedback (i.e., regardless of HARQ feedback).

Additionally, based on an embodiment of the present disclosure, a time interval between an initial transmission resource and a retransmission resource may also be different based on whether a PSFCH resource corresponding to the PSSCH exists. For example, if there is no PSFCH resource, the time interval between the initial transmission and the retransmission resource may be relatively short. For example, if there is no PSFCH resource corresponding to the PSSCH, the transmitting UE which has transmitted the PSSCH does not expect to receive HARQ feedback. Thus, the transmitting UE may perform retransmission through PSSCH resource(s) allocated for retransmission within a faster time.

More specifically, the above method may be used when the transmitting UE transmits the PSSCH for unicast. The PSSCH may be a PSSCH used by the transmitting UE for unicast transmission. Additionally/alternatively, the above method may be used when the transmitting UE transmits a PSSCH for groupcast. In this case, in the groupcast, a PSFCH resource for HARQ feedback may be shared among a plurality of PSSCH receiving UEs. For example, if the PSFCH resource for HARQ feedback in groupcast sidelink communication are shared among a plurality of PSSCH receiving UEs, and if there is no PSFCH resource corresponding to the PSSCH, the transmitting UE which has transmitted the PSSCH may perform retransmission through PSSCH resource(s) allocated for retransmission within a shorter time than a case in which there is a PSFCH resource.

On the other hand, the above method may not be used when PSFCH resources for HARQ feedback in groupcast are divided among a plurality of PSSCH receiving UEs. Specifically, if PSFCH resources for HARQ feedback in groupcast are divided among a plurality of PSSCH receiving UEs, some receiving UEs may not be able to transmit HARQ feedback to the transmitting UE due to the lack of PSFCH resources. In this case, even if some of the receiving UEs fail to decode the PSSCH, the transmitting UE may not perform retransmission in the corresponding groupcast.

In order to solve the problem that the transmitting UE does not perform retransmission, if PSFCH resources for HARQ feedback in groupcast are divided among a plurality of PSSCH receiving UE, the transmitting UE and/or the receiving UE may determine/assume/expect that the PSFCH resources are not insufficient. For example, a situation in which the transmitting UE transmits at least one PSSCH to at least one receiving UE by using at least one sub-channel and at least one slot on a resource pool may be considered. The resource pool includes K slots and L sub-channels related to PSSCH(s) related to the PSFCH resources. In this case, M may be equal to or greater than K*L (herein, K, L, and M are positive integers). That is, since the number of PSFCH resources (M) is greater than or equal to the number of HARQ feedbacks (K*L), the transmitting UE and/or the receiving UE may (always) determine/assume/expect that the PSFCH resources are not insufficient.

Alternatively, in a situation in which PSFCH resources are insufficient, the transmitting UE and/or the receiving UE may change the HARQ feedback transmission method to a method in which a PSFCH resource for HARQ feedback in groupcast is shared among a plurality of PSSCH receiving UEs. Alternatively, in a situation in which PSFCH resources are insufficient, a UE which has not secured PSFCH resource(s) may withdraw or be excluded from the group for the corresponding groupcast.

Referring back to FIG. 14, in step S1420, the transmitting UE may transmit the PSSCH and/or the PSCCH to the receiving UE.

In step S1430, the transmitting UE may receive HARQ feedback for the PSSCH and/or the PSCCH from the receiving UE through the PSFCH resource. If the PSFCH resource is insufficient, the reception of the HARQ feedback may be omitted. In this case, additionally, the transmitting UE may retransmit PSSCH(s) and/or PSCCH(s) to the receiving UE regardless of reception of the HARQ feedback. In this case, the retransmission time when there is no PSFCH resource corresponding to the PSSCH and/or the PSCCH may be earlier than the retransmission time when there is the PSFCH resource corresponding to the PSSCH and/or the PSCCH.

Figure 18:
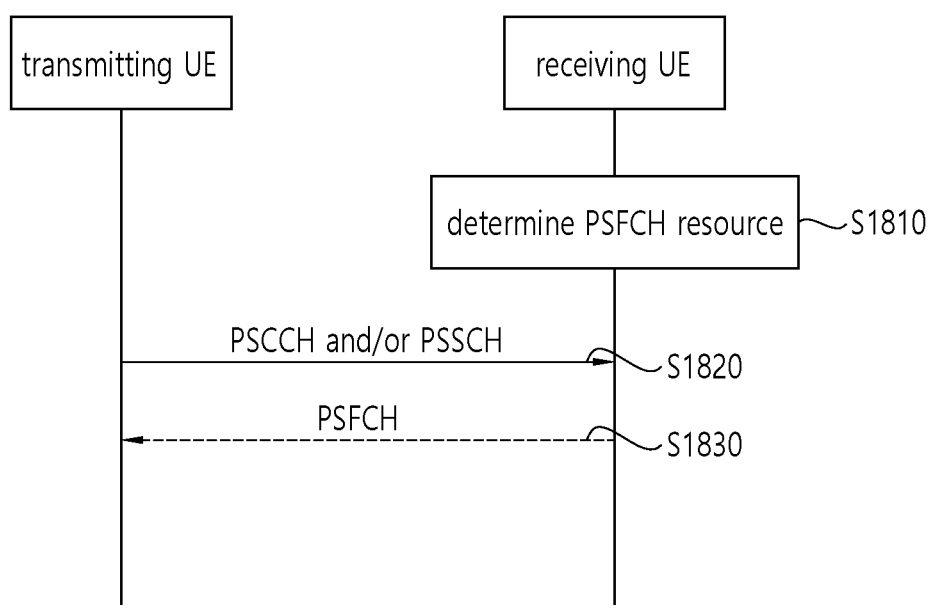
FIG. 18 shows a procedure in which a transmitting UE and a receiving UE transmit/receive a PSSCH, a PSCCH, and/or a PSFCH, based on an embodiment of the present disclosure.

FIG. 18 shows a procedure in which a transmitting UE and a receiving UE transmit/receive a PSSCH, a PSCCH, and/or a PSFCH, based on an embodiment of the present disclosure.

Referring to FIG. 18, in step S1810, the receiving UE may determine/select/allocate PSFCH resource(s). For example, based on at least one of a slot corresponding to PSCCH transmission and/or PSSCH transmission, sub-channel(s) corresponding to PSCCH transmission and/or PSSCH transmission, RB(s) corresponding to PSCCH transmission and/or PSSCH transmission, a cast type, a HARQ feedback method, information related to the PSSCH transmitting UE, information related to PSSCH transmission, or information related to the PSSCH receiving UE, the receiving UE may select the PSFCH resource(s) to be used for HARQ feedback. A method in which the receiving UE determines the PSFCH resource(s) may be the same as the method in which the transmitting UE determines the PSFCH resource(s).

In step S1820, the receiving UE may receive the PSSCH and/or the PSCCH from the transmitting UE.

In step S1830, the receiving UE may transmit HARQ feedback for the PSSCH and/or the PSCCH to the transmitting UE through the PSFCH resource. If the PSFCH resource is insufficient, transmission of the HARQ feedback may be omitted. In this case, additionally, the receiving UE may re-receive PSSCH(s) and/or PSCCH(s) from the transmitting UE regardless of transmission of the HARQ feedback. In this case, the re-reception time when there is no PSFCH resource corresponding to the PSSCH and/or the PSCCH may be earlier than the re-reception time when there is the PSFCH resource corresponding to the PSSCH and/or the PSCCH.

Based on an embodiment of the present disclosure, the UE/base station may efficiently perform the HARQ process operation based on the presence or absence of the PSFCH resource. Accordingly, an effect of efficiently supporting the HARQ operation may occur.

Figure 19:
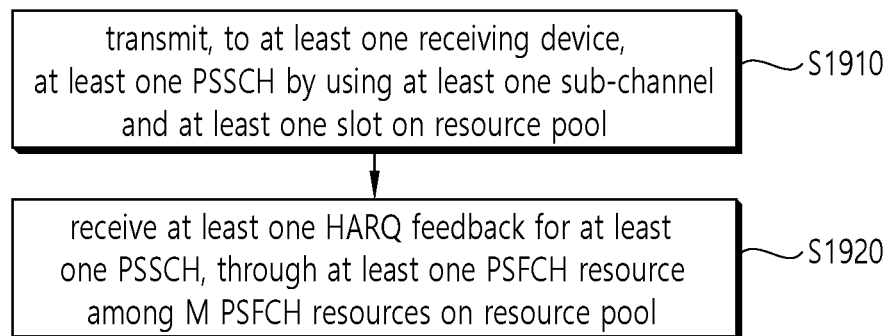
FIG. 19 shows operations of a first device, based on an embodiment of the present disclosure.

FIG. 19 shows operations of a first device, based on an embodiment of the present disclosure.

The operations disclosed in the flowchart of FIG. 19 may be performed in combination with various embodiments of the present disclosure. For example, the operations disclosed in the flowchart of FIG. 19 may be performed based on at least one of devices illustrated in FIGS. 21 to 26. For example, the first device of FIG. 19 may be the first wireless device 100 of FIG. 22 to be described later. In another example, the first device of FIG. 19 may be the second wireless device 200 of FIG. 22 to be described later.

In step S1910, the first device may transmit, to at least one receiving device, at least one physical sidelink shared channel (PSSCH) by using at least one sub-channel and at least one slot on a resource pool.

In step S1920, the first device may receive at least one hybrid automatic repeat request (HARQ) feedback for the at least one PSSCH, through at least one physical sidelink feedback channel (PSFCH) resource among M PSFCH resources on the resource pool.

For example, the resource pool may include L sub-channels and K slots related to PSSCHs related to the PSFCH resources. In this case, M may be equal to or greater than K*L, and K, L and M may be positive integers.

For example, as M is greater than or equal to K*L, the transmitting UE (the first device) and/or the receiving UE may determine/assume/expect that PSFCH resources are not insufficient if the PSFCH resources for HARQ feedback in groupcast are divided among a plurality of PSSCH receiving UEs.

For example, a PSFCH resource index for representing each of the at least one PSFCH resource may be determined based on a modulo function.

For example, the PSFCH resource index may be determined based on the modulo function, with a size of a physical domain of a PSFCH resource for the at least one PSSCH as a parameter.

For example, the PSFCH resource index may be determined by applying the modulo function, with the size of the physical domain and a virtual PSFCH resource index of a logical domain of the PSFCH resource for the at least one PSSCH as parameters.

For example, the PSFCH resource index may be determined by (the virtual PSFCH resource index) mod (the size of the physical domain) or mod (the virtual PSFCH resource index, the size of the physical domain).

For example, the virtual PSFCH resource index of the logical domain of the PSFCH resource may be determined based on at least one of the L sub-channels, the K slots related to the PSSCHs, or an interval between PSFCH resources. For example, the size of the physical domain of the PSFCH resource may be determined based on the M PSFCH resources and at least one code resource.

For example, the virtual PSFCH resource index of the logical domain of the PSFCH resource may be determined as $P_{ID}+M_{ID}$. The $P_{ID}$ may be a physical layer source ID provided by SCI format 0_2 for scheduling PSSCH reception, and the $M_{ID}$ may be 0 or an ID of a UE receiving the PSSCH indicated by a higher layer.

For example, the size of the physical domain of the PSFCH resource may indicate/represent the size of the resource domain for the PSFCH based on at least one of a time resource, a frequency resource, or a code resource. For example, the size of the physical domain of the PSFCH resource may indicate/represent the size of the resource domain for the PSFCH based on the time resource, the frequency resource, and the code resource. In this case, for example, the logical domain of the PSFCH resource for the PSSCH may indicate/represent a PSFCH resource domain determined based on other factors without considering the physical domain. However, this example is only an example of defining the size of the physical domain of the PSFCH resource and the logical domain of the PSFCH resource, and the definition of the physical domain and the logical domain described throughout the present disclosure is not limited by this example.

For example, the M PSFCH resources may be allocated on a first slot, and a PSFCH resource related to a slot closest in time to the first slot among the K slots related to the PSSCHs may be one of the at least one PSFCH resource.

For example, a PSFCH resource related to a slot farthest in time from the first slot among the K slots related to the PSSCHs may not be included in the at least one PSFCH resource.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, anon-transitory computer-readable storage medium storing instructions may be provided. The instructions, when executed, may cause a first device to: transmit, to at least one receiving device, at least one physical sidelink shared channel (PSSCH) by using at least one sub-channel and at least one slot on a resource pool; and receive at least one hybrid automatic repeat request (HARQ) feedback for the at least one PSSCH, through at least one physical sidelink feedback channel (PSFCH) resource among M PSFCH resources on the resource pool, wherein the resource pool includes L sub-channels and K slots related to PSSCHs related to the PSFCH resources, wherein M is equal to or greater than K*L, and wherein K, L and M are positive integers.

Figure 20:
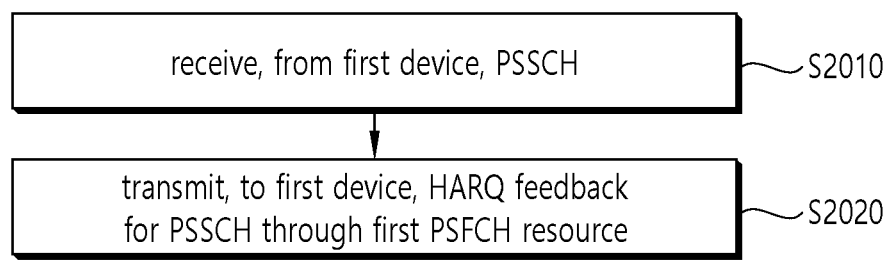
FIG. 20 shows operations of a second device, based on an embodiment of the present disclosure.

FIG. 20 shows operations of a second device, based on an embodiment of the present disclosure.

The operations disclosed in the flowchart of FIG. 20 may be performed in combination with various embodiments of the present disclosure. For example, the operations disclosed in the flowchart of FIG. 20 may be performed based on at least one of devices illustrated in FIGS. 21 to 26. For example, the second device of FIG. 20 may be the second wireless device 200 of FIG. 22 to be described later. In another example, the second device of FIG. 20 may be the first wireless device 100 of FIG. 22 to be described later.

In step S2010, the second device may receive, from a first device, a physical sidelink shared channel (PSSCH).

In step S2020, the second device may transmit, to the first device, a first hybrid automatic repeat request (HARQ) feedback for the PSSCH through a first physical sidelink feedback channel (PSFCH) resource.

For example, at least one PSSCH including the PSSCH may be transmitted by the first device to at least one receiving device including the second device by using at least one sub-channel and at least one slot on a resource pool.

For example, at least one HARQ feedback for the at least one PSSCH may be received by the first device through at least one PSFCH resource among M PSFCH resources on the resource pool.

For example, the at least one HARQ feedback may include the first HARQ feedback, and the at least one PSFCH resource includes the first PSFCH resource, and the resource pool may include L sub-channels and K slots related to PSSCHs related to the PSFCH resources, and M may be equal to or greater than K*L, and K, L and M may be positive integers.

For example, as M is greater than or equal to K*L, the transmitting UE (the first device) and/or the receiving UE may determine/assume/expect that PSFCH resources are not insufficient if the PSFCH resources for HARQ feedback in groupcast are divided among a plurality of PSSCH receiving UEs.

For example, a PSFCH resource index for representing each of the at least one PSFCH resource may be determined based on a modulo function.

For example, the PSFCH resource index may be determined based on the modulo function, with a size of a physical domain of a PSFCH resource for the at least one PSSCH as a parameter.

For example, the PSFCH resource index may be determined by applying the modulo function, with the size of the physical domain and a virtual PSFCH resource index of a logical domain of the PSFCH resource for the at least one PSSCH as parameters.

For example, the PSFCH resource index may be determined by (the virtual PSFCH resource index) mod (the size of the physical domain) or mod (the virtual PSFCH resource index, the size of the physical domain).

For example, the virtual PSFCH resource index of the logical domain of the PSFCH resource may be determined based on at least one of the L sub-channels, the K slots related to the PSSCHs, or an interval between PSFCH resources. For example, the size of the physical domain of the PSFCH resource may be determined based on the M PSFCH resources and at least one code resource.

For example, the virtual PSFCH resource index of the logical domain of the PSFCH resource may be determined as $P_{ID}+M_{ID}$. The $P_{ID}$ may be a physical layer source ID provided by SCI format 0_2 for scheduling PSSCH reception, and the $M_{ID}$ may be 0 or an ID of a UE receiving the PSSCH indicated by a higher layer.

For example, the M PSFCH resources may be allocated on a first slot, and a PSFCH resource related to a slot closest in time to the first slot among the K slots related to the PSSCHs may be one of the at least one PSFCH resource.

For example, a PSFCH resource related to a slot farthest in time from the first slot among the K slots related to the PSSCHs may not be included in the at least one PSFCH resource.

Based on an embodiment of the present disclosure, a second device configured to perform sidelink (SL) communication may be provided. The second device may comprise: at least one memory storing instructions; at least one transceiver; and at least one processor connected to the at least one memory and the at least one transceiver. The at least one processor may execute the instructions to: receive, from a first device, a physical sidelink shared channel (PSSCH); and transmit, to the first device, a first hybrid automatic repeat request (HARQ) feedback for the PSSCH through a first physical sidelink feedback channel (PSFCH) resource, wherein at least one PSSCH including the PSSCH is transmitted by the first device to at least one receiving device including the second device by using at least one sub-channel and at least one slot on a resource pool, wherein at least one HARQ feedback for the at least one PSSCH is received by the first device through at least one PSFCH resource among M PSFCH resources on the resource pool, wherein the at least one HARQ feedback includes the first HARQ feedback, and the at least one PSFCH resource includes the first PSFCH resource, wherein the resource pool includes L sub-channels and K slots related to PSSCHs related to the PSFCH resources, wherein M is equal to or greater than K*L, and wherein K, L and M are positive integers.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
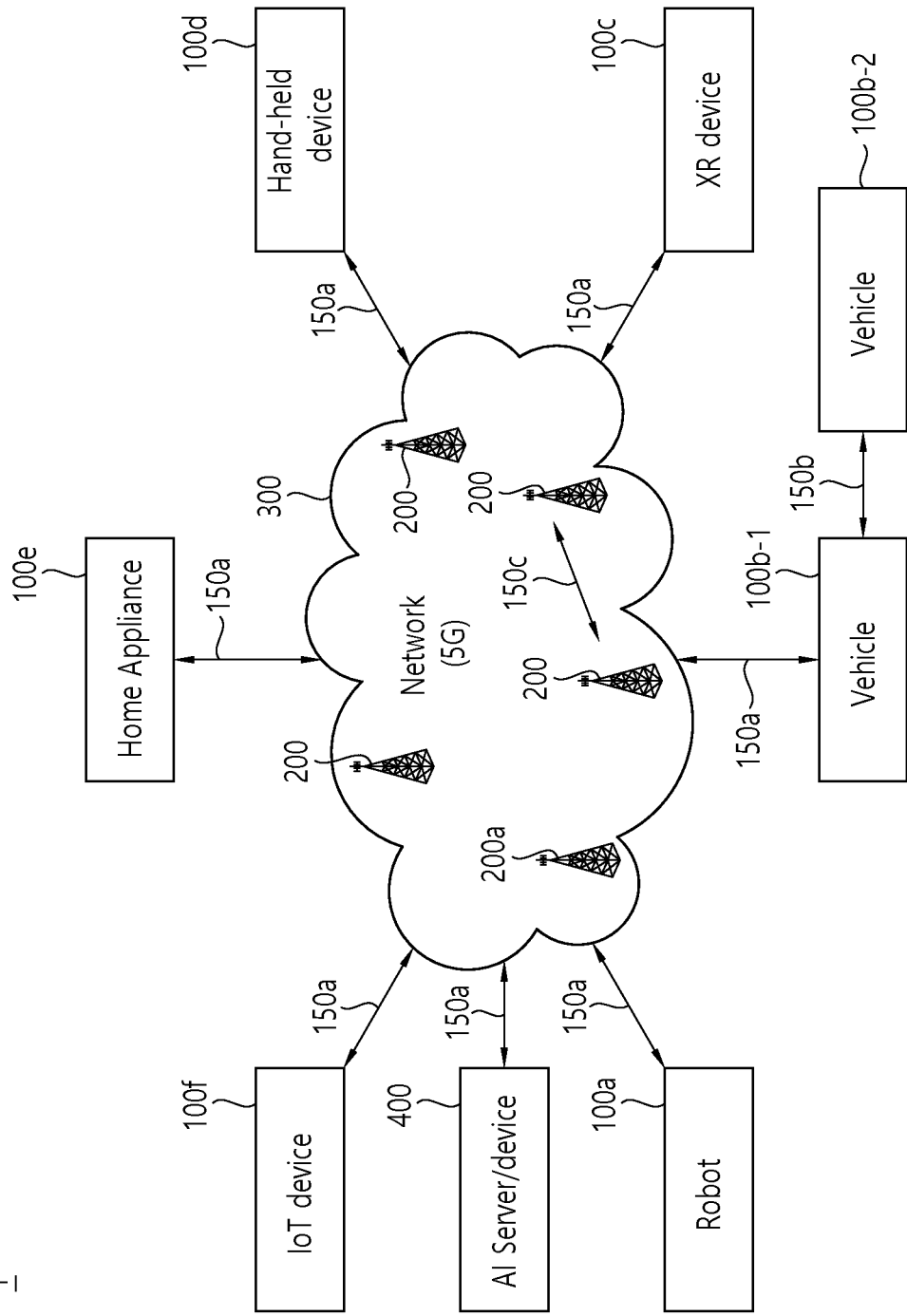
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
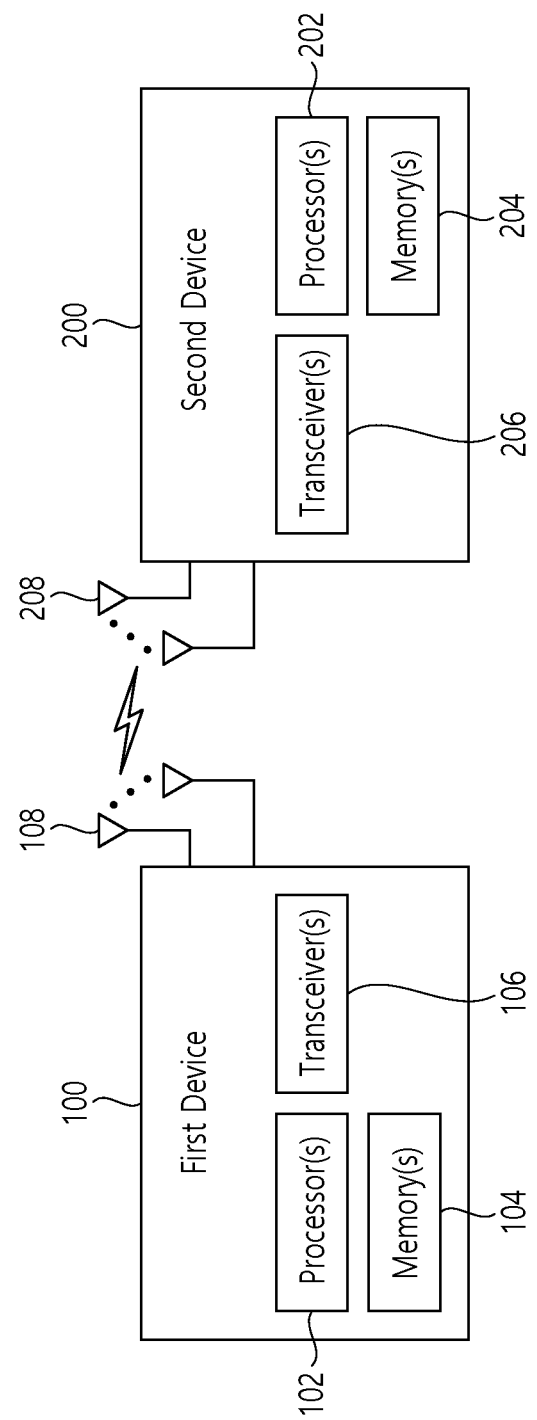
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
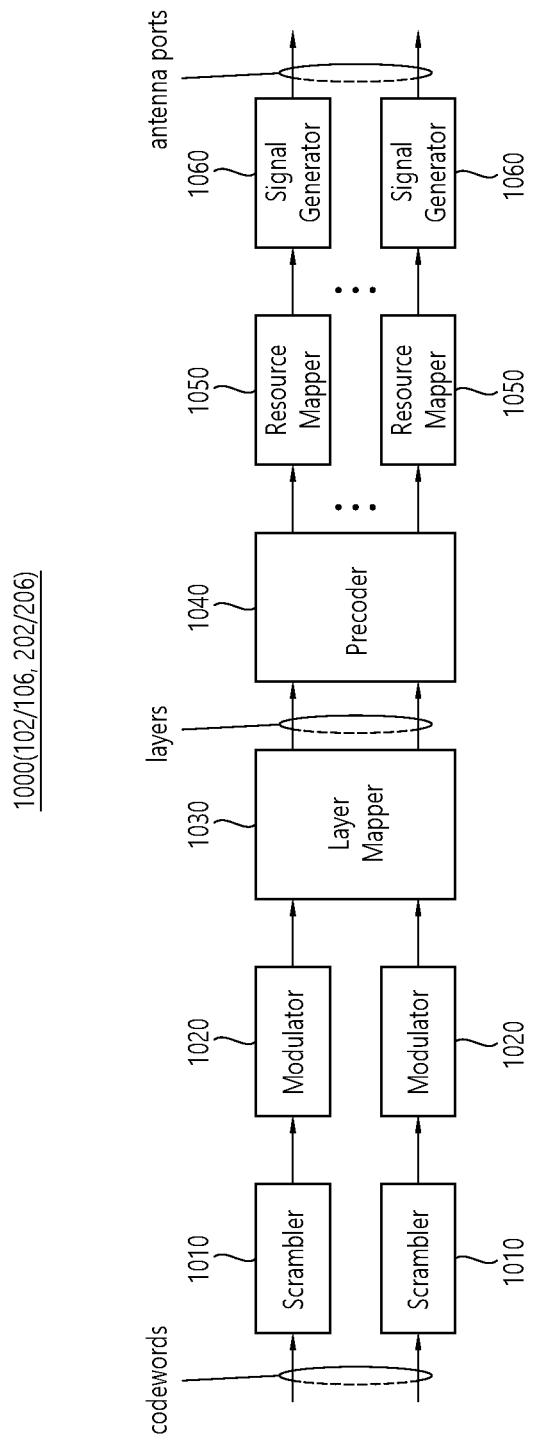
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
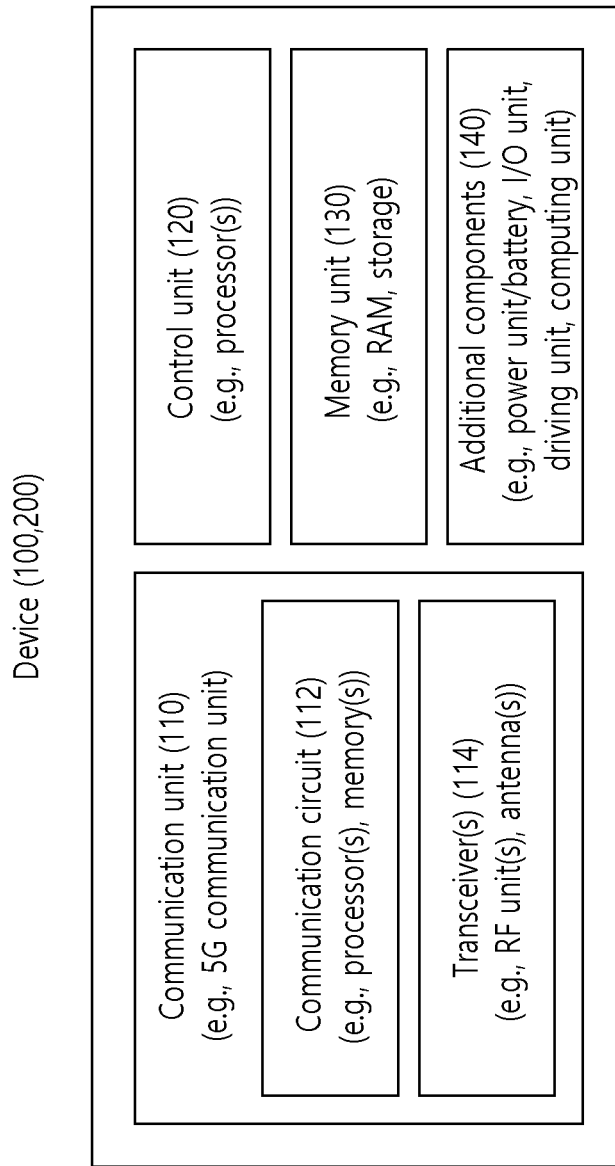
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
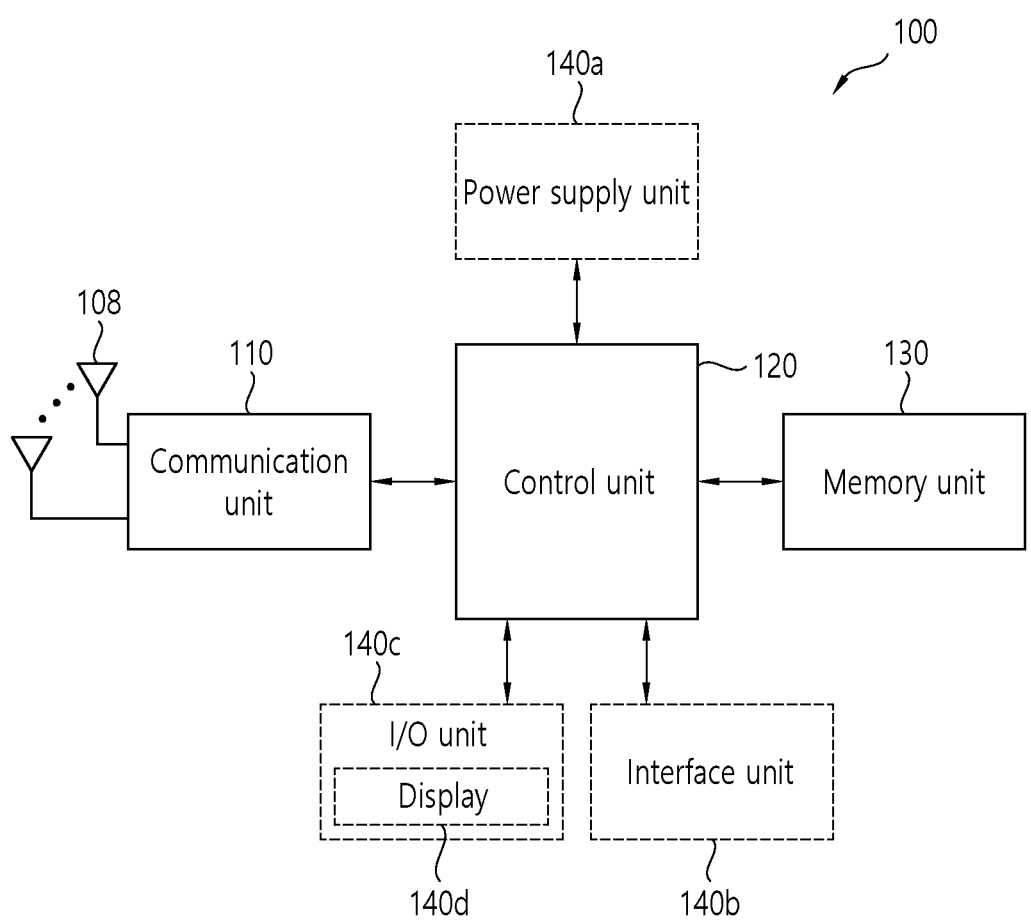
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
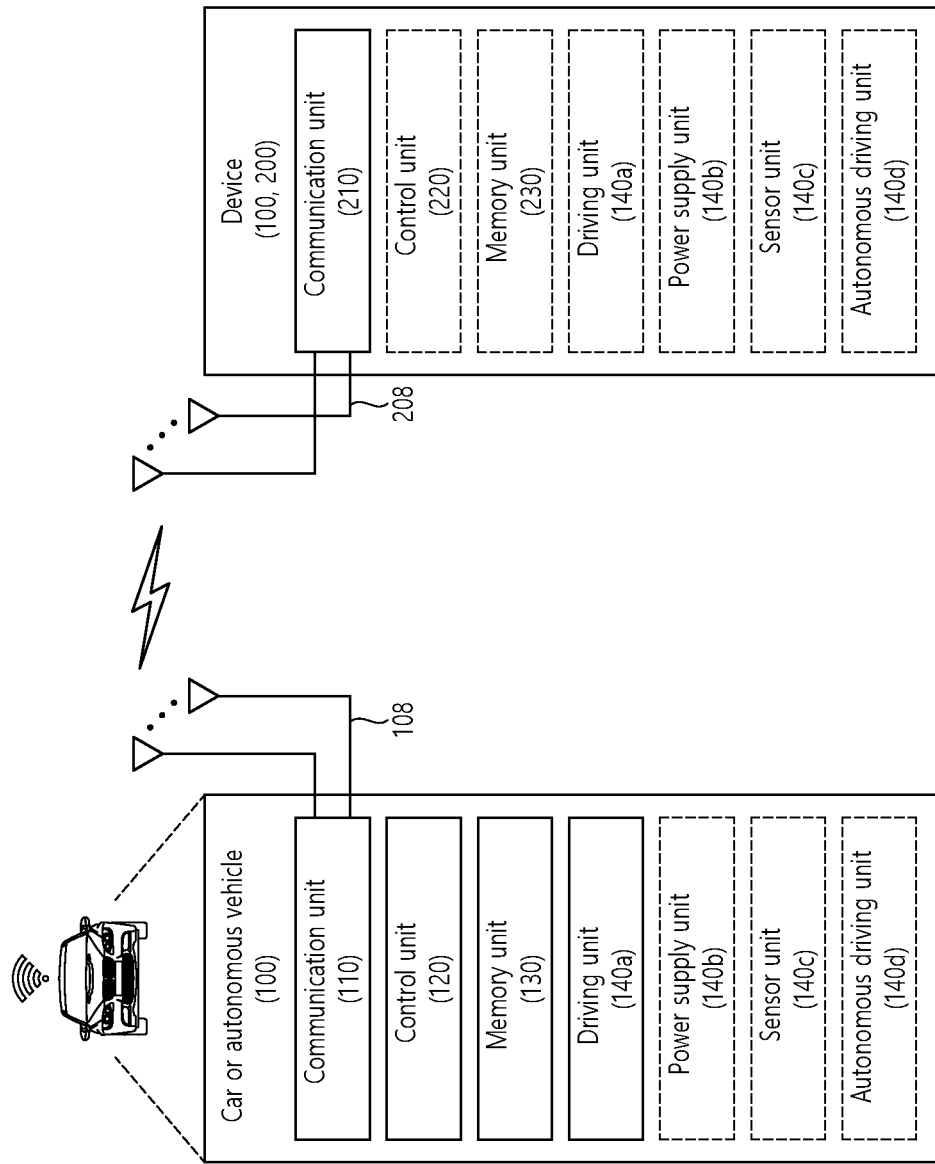
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication by a first device, the method comprising:
   receiving, from a second device, a physical sidelink shared channel (PSSCH) in a resource pool;
   determining a physical sidelink feedback channel (PSFCH) resource index of a PSFCH resource for PSFCH transmission, among M PSFCH resources in the resource pool, wherein the PSFCH resource is related to a slot allocated for the PSSCH and at least one sub-channel allocated for the PSSCH; and
   transmitting, to the second device, a first hybrid automatic repeat request (HARQ) feedback for the PSSCH based on the PSFCH resource, in response to reception of the PSSCH,
   wherein the PSFCH resource index of the PSFCH resource for PSFCH transmission is determined as a second index, which is a remainder obtained by dividing a first index related to the PSFCH resource by a number of available PSFCH resources,
   wherein the resource pool includes L sub-channels and K PSSCH slots related to a PSFCH slot including the M PSFCH resources,
   wherein a number of PSFCH resources M in the resource pool is equal to or greater than a value obtained by multiplying a number of PSSCH slots K related to the PSFCH slot and a number of sub-channels L in the resource pool, and
   wherein K, L and M are positive integers.

2. The method of claim 1, wherein the first index related to the PSFCH resource is obtained based on at least one of a source identifier (ID) of the second device or an identity of the first device receiving the PSSCH.

3. The method of claim 2, wherein the identity of the first device is provided by a higher layer.

4. The method of claim 1, wherein it is not allowed that the number of PSFCH resources M in the resource pool is less than the value obtained by multiplying the number of PSSCH slots K related to the PSFCH slot and the number of sub-channels L in the resource pool.

5. The method of claim 1, wherein the number of PSSCH slots K related to the PSFCH slot is a period of the PSFCH resource.

6. A first device configured to perform sidelink (SL) communication, the first device comprising:
   at least one memory storing instructions;
   at least one transceiver; and
   at least one processor connected to the at least one memory and the at least one transceiver, wherein the at least one processor executes the instructions to:
   control the at least one transceiver to receive, from a second device, a physical sidelink shared channel (PSSCH) in a resource pool;
   determine a physical sidelink feedback channel (PSFCH) resource index of a PSFCH resource for PSFCH transmission, among M PSFCH resources in the resource pool, wherein the PSFCH resource is related to a slot allocated for the PSSCH and at least one sub-channel allocated for the PSSCH; and
   control the at least one transceiver to transmit, to the second device, a first hybrid automatic repeat request (HARQ) feedback for the PSSCH based on the PSFCH resource, in response to reception of the PSSCH,
   wherein the PSFCH resource index of the PSFCH resource for PSFCH transmission is determined as a second index, which is a remainder obtained by dividing a first index related to the PSFCH resource by a number of available PSFCH resources,
   wherein the resource pool includes L sub-channels and K PSSCH slots related to a PSFCH slot including the M PSFCH resources,
   wherein a number of PSFCH resources M in the resource pool is equal to or greater than a value obtained by multiplying a number of PSSCH slots K related to the PSFCH slot and a number of sub-channels L in the resource pool, and
   wherein K, L and M are positive integers.

7. The first device of claim 6, wherein the first index related to the PSFCH resource is obtained based on at least one of a source identifier (ID) of the second device or an identity of the first device receiving the PSSCH.

8. The first device of claim 7, wherein the identity of the first device is provided by a higher layer.

9. The first device of claim 6, wherein it is not allowed that the number of PSFCH resources M in the resource pool is less than the value obtained by multiplying the number of PSSCH slots K related to the PSFCH slot and the number of sub-channels L in the resource pool.

10. The first device of claim 6, wherein the number of PSSCH slots K related to the PSFCH slot is a period of the PSFCH resource.

11. A processing device configured to control a first device, the processing device comprising:
    at least one processor; and
    at least one memory connected to the at least one processor and storing instructions, wherein the at least one processor executes the instructions to:
    receive, from a second device, a physical sidelink shared channel (PSSCH) in a resource pool;

determine a physical sidelink feedback channel (PSFCH) resource index of a PSFCH resource for PSFCH transmission, among M PSFCH resources in the resource pool, wherein the PSFCH resource is related to a slot allocated for the PSSCH and at least one sub-channel allocated for the PSSCH; and transmit, to the second device, a first hybrid automatic repeat request (HARQ) feedback for the PSSCH based on the PSFCH resource, in response to reception of the PSSCH, wherein the PSFCH resource index of the PSFCH resource for PSFCH transmission is determined as a second index, which is a remainder obtained by dividing a first index related to the PSFCH resource by a number of available PSFCH resources, wherein the resource pool includes L sub-channels and K PSSCH slots related to a PSFCH slot including the M PSFCH resources, wherein a number of PSFCH resources M in the resource pool is equal to or greater than a value obtained by multiplying a number of PSSCH slots K related to the PSFCH slot and a number of sub-channels L in the resource pool, and wherein K, L and M are positive integers.

12. The processing device of claim 11, wherein the first index related to the PSFCH resource is obtained based on at least one of a source identifier (ID) of the second device or an identity of the first device receiving the PSSCH.

13. The processing device of claim 12, wherein the identity of the first device is provided by a higher layer.

14. The processing device of claim 11, wherein it is not allowed that the number of PSFCH resources M in the resource pool is less than the value obtained by multiplying the number of PSSCH slots K related to the PSFCH slot and the number of sub-channels L in the resource pool.

15. The processing device of claim 11, wherein the number of PSSCH slots K related to the PSFCH slot is a period of the PSFCH resource.

* * * * *